US011879706B2

(12) United States Patent
Newton

(10) Patent No.: US 11,879,706 B2
(45) Date of Patent: Jan. 23, 2024

(54) METHODS AND APPARATUS FOR NON-LETHAL WEAPONS COMPRISING A POWER AMPLIFIER TO PRODUCE A NONLETHAL BEAM OF ENERGY

(71) Applicant: Frederick Lee Newton, Albuquerque, NM (US)

(72) Inventor: Frederick Lee Newton, Albuquerque, NM (US)

( * ) Notice: Subject to any disclaimer, the term of this patent is extended or adjusted under 35 U.S.C. 154(b) by 355 days.

(21) Appl. No.: 17/426,593

(22) PCT Filed: Jan. 28, 2020

(86) PCT No.: PCT/US2020/015496
§ 371 (c)(1),
(2) Date: Jul. 28, 2021

(87) PCT Pub. No.: WO2020/160055
PCT Pub. Date: Aug. 6, 2020

(65) Prior Publication Data
US 2022/0099413 A1 Mar. 31, 2022

Related U.S. Application Data

(60) Provisional application No. 62/797,443, filed on Jan. 28, 2019.

(51) Int. Cl.
*F41H 13/00* (2006.01)
*H01Q 13/20* (2006.01)

(52) U.S. Cl.
CPC ......... *F41H 13/0068* (2013.01); *H01Q 13/20* (2013.01)

(58) Field of Classification Search
CPC ................................ F41H 13/00; H01Q 13/20
(Continued)

(56) References Cited

U.S. PATENT DOCUMENTS 5,072,342 A 12/1991 Minovitch
5,549,220 A 8/1996 Whalen
(Continued)

FOREIGN PATENT DOCUMENTS

CN 103256857 B 9/2015
CN 105783589 A 7/2016
(Continued)

OTHER PUBLICATIONS

Wang et al, Improvements in the Power Performance of GaN HEMPT by using Quarternary InAlGaN Barrier Feb. 16, 2018; IEEE; Journal Feb. 16, 2018, pp. 360-364, vol. 6, 2018https://ieeexplore.ieee.org/stamp/stamp.jsp?tp=&arnumber=8293769.

*Primary Examiner* — Que Tan Le

(57) ABSTRACT

A hand-held nonlethal weapon comprises a body and a battery coupled to the body. The hand-held nonlethal weapon further comprises a power supply operably coupled to the battery. The hand-held nonlethal weapon further comprises a power amplifier operably coupled to the power supply. The power amplifier is operable to produce a non-lethal beam of energy. The hand-held nonlethal weapon further comprises a beamformer operably coupled to the power amplifier, the beamformer being operable to shape and direct a nonlethal beam of energy. The hand-held nonlethal weapon further comprises a trigger coupled to the body and operably coupled to the power amplifier and to the beamformer, wherein the trigger is operable to be activated and wherein activating the trigger is operable to initiate the formation of a nonlethal beam of energy and wherein the nonlethal beam of energy is operable to be projected from the body.

20 Claims, 6 Drawing Sheets

(58) Field of Classification Search
USPC .................................. 250/214 A, 214 R, 216
See application file for complete search history.

(56) References Cited

U.S. PATENT DOCUMENTS

| | | | | |
|---|---|---|---|---|
| 6,054,694 | A | 4/2000 | Paustian | |
| 6,793,364 | B2 | 9/2004 | Cramer et al. | |
| 6,822,250 | B2 * | 11/2004 | Korenev .................. | H05G 1/20<br>250/493.1 |
| 7,928,900 | B2 | 4/2011 | Fuller et al. | |
| 8,049,173 | B1 | 11/2011 | Brown | |
| 8,453,551 | B2 | 6/2013 | Rosenberg et al. | |
| 9,450,310 | B2 | 9/2016 | Bily et al. | |
| 9,589,448 | B1 | 3/2017 | Schneider et al. | |
| 2006/0233215 | A1 | 10/2006 | Casazza | |
| 2009/0254345 | A1 | 10/2009 | Fleizach et al. | |
| 2015/0334487 | A1 | 11/2015 | Bowers et al. | |
| 2017/0350965 | A1 | 12/2017 | Schmalenberg | |
| 2018/0252506 | A1 | 9/2018 | Hoboy | |
| 2020/0160831 | A1 | 5/2020 | Newton | |

FOREIGN PATENT DOCUMENTS

| | | | |
|---|---|---|---|
| WO | WO 2018/106437 | A2 | 6/2018 |
| WO | WO 2018/169639 | A1 | 9/2018 |

* cited by examiner

METHODS AND APPARATUS FOR NON-LETHAL WEAPONS COMPRISING A POWER AMPLIFIER TO PRODUCE A NONLETHAL BEAM OF ENERGY

CROSS-REFERENCE TO RELATED APPLICATION

This application claims the benefit of U.S. provisional patent application 62/797,443 filed Jan. 28, 2019, which is incorporated herein in its entirety by reference.

BACKGROUND

Methods and apparatus are disclosed herein for nonlethal weapons. The reporting of lethal events has recently increased drastically. Events such as home invasions, officer-involved shootings, mass shootings involving a single shooter and other events have increased substantially in recent years. Such acts are difficult to defend against and have drastic and fatal consequences.

The principle of active denial has been used as a means of deterring groups of would-be attackers with the purpose of separating leaders from followers by exposing an entire group to separate and deter the leaders with the use of an electromagnetic pain beam.

SUMMARY OF THE INVENTION

A hand-held nonlethal weapon may comprise a body and a battery coupled to the body. The hand-held nonlethal weapon may further comprise a power supply operably coupled to the battery. The hand-held nonlethal weapon may further comprise a power amplifier operably coupled to the power supply. The power amplifier may be operable to produce a nonlethal beam of energy. The hand-held nonlethal weapon may further comprise a beamformer operably coupled to the power amplifier, the beamformer being operable to shape and direct a nonlethal beam of energy. The hand-held nonlethal weapon may further comprise a trigger coupled to the body and operably coupled to the power amplifier and to the beamformer, wherein the trigger may be operable to be activated and wherein activating the trigger may be operable to initiate the formation of a nonlethal beam of energy and wherein the nonlethal beam of energy is operable to be projected from the body.

A method of projecting a beam of energy from a hand-held nonlethal weapon. The method may comprise engaging a trigger coupled to a body of the hand-held nonlethal weapon, The trigger may activate a power amplifier coupled to the body, the power amplifier comprising a resonator, wherein the power amplifier and the resonator operate at 95 Gigahertz (GHz) and produce a beam of energy at 95 GHz. The method may further comprise directing and shaping the beam of energy via a beamformer operably coupled to the power amplifier. The method may further comprise projecting the beam of energy toward an actor through at least one opening in the body.

A nonlethal weapon may comprise a handheld personal defense device, or a service weapon for law enforcement. The handheld firing device may comprise a handle. The handheld firing device may further comprise a trigger adjacent to the handle. The handle may contain a high-energy density rechargeable battery. The handle may support a barrel comprising a nonlethal reactive deterrence defense subsystem, an optical subsystem operably coupled to and in communication with the nonlethal reactive deterrence defense subsystem, and an acoustic subsystem operably coupled to and in communication with the nonlethal reactive deterrence defense subsystem. The nonlethal weapon may further comprise a computer system in communication with each of the nonlethal reactive deterrence defense subsystem, the optical subsystem, and the acoustic subsystem, wherein each of the nonlethal reactive deterrence defense subsystem, the optical subsystem, and the acoustic subsystem is operable to interact with an actor.

DETAILED DESCRIPTION OF THE DRAWINGS

Known active denial systems do not include any specific hardware design that would lead to a size and capability to yield a self-contained nonlethal handgun with sufficient delivered power to provide that deterrence and to do so repeatedly in rapid sequence to defend against a determined aggressor or multiple aggressors.

The inventor has therefore developed a nonlethal reactive deterrence weapon based on technological developments in W-band power amplification. The terms "reactive deterrence" are applied because the inventor describes a new concept of a nonlethal weapon intended only for personal defense against aggressors in such a manner that those intending to do harm or destruction of people or property are deterred from doing so. The developments are sufficiently powerful, small volume, and with special heat dissipation hardware to permit rapid-fire and a large number of activations over hours, minutes and even seconds. Furthermore, the inventor based the design on a nonlethal reactive deterrence weapon that is untethered by any waveguide or other electrical connection to a separate source of power or radio frequency energy.

Figure 1:
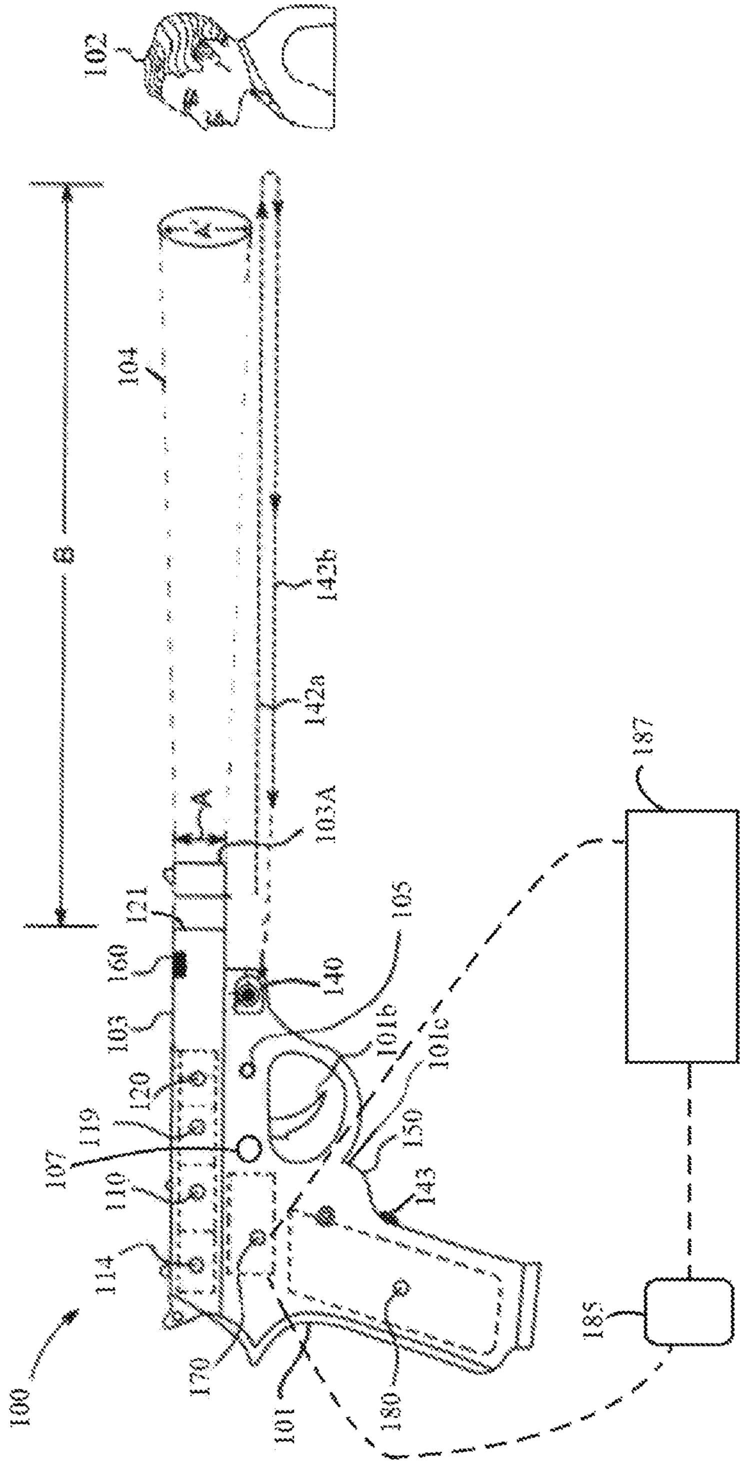
FIG. 1 illustrates a hand-held nonlethal weapon.

A hand-held nonlethal weapon is referred to in FIG. 1. FIG. 1 illustrates an embodiment of the hand-held nonlethal weapon, in particular, FIG. 1 illustrates a hand-held nonlethal weapon 100. The hand-held nonlethal weapon 100 may act to deter an actor 102. Actor 102 may pose some type of threat to a population or to an individual. The threat may be violent in nature. Actor 102 may refer to multiple actors.

The hand-held nonlethal weapon 100 may comprise several subsystems that act in cooperation to deter actor 102 and to document the encounter. The hand-held nonlethal weapon 100 may comprise a body 101. The body 101 may comprise any suitable material, such as a plastic, a hard plastic, a composite material, a carbon composite material, metal, or other suitable material. The body 101 may be operable to support multiple components and subsystems described herein.

The hand-held nonlethal weapon 100 may further comprise a barrel 103 operably coupled to the body 101. The body 101 may comprise a trigger 101*b* operably coupled to the body 101. The trigger 101*b* may be operable to be engaged by a user. The trigger 101*b* may initiate the creation of a reactive deterrence beam, as discussed herein below.

In some embodiments, body 101 may further comprise a power-on safety switch 101*c*. The power-on safety switch 101*c* may be operable to activate the various subsystems described herein below upon being engaged. The power-on safety switch 101*c* may be operably connected to each of the subsystems described herein below, such that each of the subsystems may become operable upon a user engaging the power-on safety switch 101*c* or may become operable upon engaging the power-on safety switch 101*c* in combination with an additional activation protocol, which will be discussed herein. The power-on safety switch 101*c* may be coupled to the body 101 and may be engaged by the hand of a user gripping the body 101. Further, the power-on safety switch 101*c* may be mounted on the front or rear side of the body 101.

The barrel 103 may comprise an opening 103*a*. In some embodiments, the barrel opening 103*a* may have an inner diameter "A" of 2.65 centimeters (cm). In further embodiments, the barrel opening 103*a* inner diameter may be smaller than 2.65 cm, such as for example, between 1 cm and 2.65 cm. In further embodiments, the barrel opening 103*a* inner diameter may be larger, such as, for example, 2.65 cm to 4.0 cm. The purpose of the barrel 103 is only to aid private individuals or law enforcement personnel in aiming the hand-held nonlethal weapon 100 in a similar manner as with handguns with which they may be more acquainted. The primary aiming procedure uses a laser range finder 140 that is activated when the user pulls the trigger 101*b* half-way back producing the outgoing laser beam 142*a*. To aim the hand-held nonlethal weapon 100 precisely, the user must observe the laser beam 142*a* at the target 102 and move the weapon such that the beam 142*b* reflected by the target is from a central location high on the target's chest near the base of the neck. Aiming the hand-held nonlethal weapon 100 using the barrel 103 is only a non-essential step that may be attractive to those who have been trained in traditional lethal weapons. Therefore, in further embodiments, the barrel 103 may be shortened or removed entirely. The power amplifier 119, beamformer 120, and hermetic coating 121 of the reactive deterrence subsystem, as described herein below, may be less than one centimeter thick and in further embodiments may be flush-mounted in or on a hand-held vertical surface in which the other components such as the trigger 101*b*, laser rangefinder 140, battery 180, power supply 170, data storage 114, and control drivers 110 would all be located elsewhere in the alternative packaging to that of a configuration of the hand-held nonlethal weapon 100 in FIG. 1.

The hand-held nonlethal weapon 100 of FIG. 1 may further comprise a battery 180. The battery 180 may be located within the body 101 and may be operably coupled to the trigger 101*b*. In some embodiments the battery 180 may be a rechargeable battery. The battery 180 may be a nickel-metal hydride battery, or other suitable rechargeable battery. The battery 180 may be operably coupled to and may be operable to provide power to all subsystems and components of the hand-held nonlethal weapon 100 that require power to operate. The battery 180 may be positioned within the body 101 and may be operably coupled to the body 101 such that the hand-held nonlethal weapon 100 may be moved and carried in a manner similar to personal or service weapons.

In further embodiments, the hand-held nonlethal weapon 100 may comprise a power supply 170. The power supply 170 may be coupled to the body 101 and may be operably coupled to the battery 180. The battery 180 may be operable to provide power to the power supply 170. The power supply 170 may be operably coupled to and may be operable to provide various voltages at various levels to all electronic subsystems and components of the hand-held nonlethal weapon 100 that require power to operate.

The hand-held nonlethal weapon 100 may further comprise a power amplifier 119. The power amplifier 119 may be operably coupled to the power supply 170, which may be operable to supply power to the power amplifier 119. The power amplifier 119 may be operable to create a nonlethal beam, such as beam 104, as discussed herein below.

The hand-held nonlethal weapon 100 of FIG. 1 may further comprise a beamformer 120. The beamformer 120 may be coupled to the barrel 103 of the hand-held nonlethal weapon 100. The beamformer 120 may be operable to form, with the power amplifier 119, a reactive deterrence beam 104, which may be projected from the hand-held nonlethal weapon 100 through the opening 103*a*. In some embodiments, the reactive deterrence beam 104 may be projected in the direction of actor 102 and the reactive deterrence beam 104 may contact actor 102 in the face, hands, arms, chest, or other portion of the body of actor 102. The beamformer 120 may comprise metamaterial devices or layers, as will be described herein below.

Figure 2A:
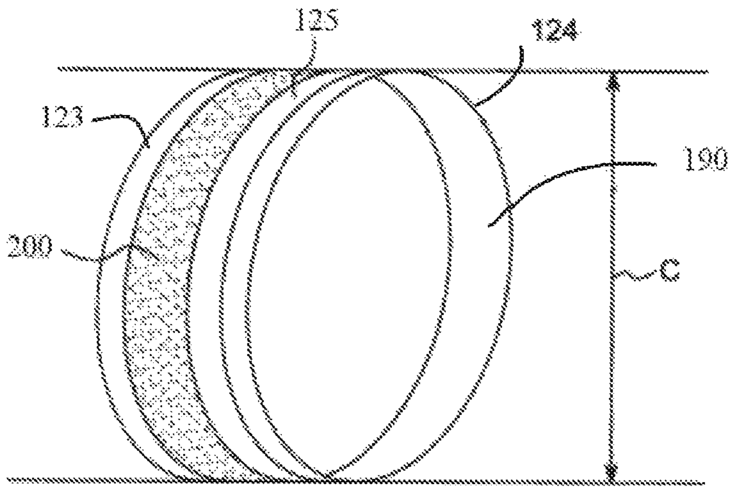
FIGS. 2*a* and 2*b* illustrate an enhanced view of the source, power amplifier, beamformer and hermetic seal.

FIG. 2*a* illustrates in further detail a representative beamformer, a representative power amplifier, and related components. FIG. 2*a* illustrates a beamformer 190. Beamformer 190 may be represent any beamformer discussed herein, such as beamformer 120, shown in FIG. 1. As related to other embodiments, beamformer 190 may represent other beamformers found in other embodiments, as will be indicated. Power amplifier 200 may represent any power amplifier as discussed herein, such as power amplifier 119, as shown and described in FIG. 1. As related to other embodiments, beamformer 190 may represent other beamformers found in other embodiments, as will be indicated.

As illustrated in the detail of FIG. 2*a*, the beamformer 190 may be operably coupled to a reactive deterrence power amplifier 200 via an output conditioning network 125. The power amplifier 200 may be operable to increase the output signal. Working with the beamformer 190, the power amplifier 200 may be operable to create the reactive deterrence beam 104. The power amplifier 200 may comprise an array of high electron mobility transistors (HEMT). HEMT, also known as heterostructure field effect transistors or modulation doped transistors, incorporate a junction between at least two materials having different band gaps as the channel instead of the doped region. Typically, these are used to provide high levels of performance at microwave frequencies, including very high frequencies with millimeter wavelengths.

Further, the HEMT devices of power amplifier 200 may operate in the W-band at approximately 95 GHz. The HEMT devices may comprise Series III and Series V elements, such as, for example, Gallium Nitride (GaN). Further, the power amplifier 200 may comprise a solid-state device operating in a range from 90-100 GHz or any frequency approved by a government with jurisdiction to produce reactive deterrence pain without permanent injury or death. The power amplifier 200 may comprise power transistors such as those described herein. This may result in a solid-state device being operable to produce an FET source output of at least approximately 20 Watts/mm of gate width. Such a production of 10 to 20 or more such devices in a monolithic microwave integrated circuit (MMICs) package or packages is adequate to produce the beam necessary to deter actor 102 from actions with negative consequences by, for example, directing a beam of ½ to 1 watt per square centimeter for ½ to 1 second at the face of actor 102. Such a beam would create a sensation of pain and heat in the skin of actor 102 without causing any permanent damage. Typically, most people experiencing this move immediately to avoid the pain. The hand-held nonlethal weapon 100 would be further capable of creating and forming a beam at other intensities for different durations.

The output conditioning network 125 between the power amplifier 200 and the beamformer 190, which may comprise a leaky wave antenna, performs the role of maximizing and preserving high efficiency. The output conditioning network 125 may comprise three roles: (a) to measure phase differences among the outputs of the HEMT devices in the power amplifier 200, (b) to correct those differences with phase shifters, and (c) to trap spurious harmonics (usually the $1^{st}$ and $3^{rd}$) and feed that energy back to the front end of the power amplifier 200. The output conditioning unit 125 functions all serve to maximize the Power Added Efficiency of the power amplifier 200. The output conditioner unit is comprised of metamaterials to perform these various functions at 95 GHz, 190 GHz and 380 GHz.

Figure 2B:
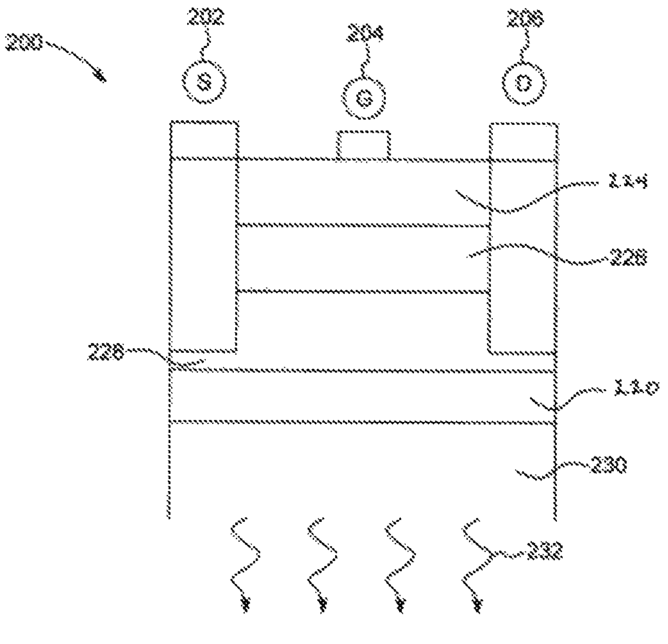

Referring again to FIG. 2*a* and to FIG. 2*b*, regarding the reactive deterrence power amplifier 200, the individual amplifier devices are further illustrated in FIG. 2*b* in a cross-sectional view. As illustrated in FIG. 2*b*, each of multiple devices that may be combined in parallel inside a MMICs package comprising power amplifier 200 may comprise at least one InAlGaN High Electron Mobility Transistor (HEMT) 224, also known as an electron supply layer. The InAlGaN HEMT 224 may further comprise a spacer layer 226. As shown in FIG. 2*b*, the spacer layer 226 may be positioned under the InAlGaN HEMT 224. The spacer layer 226 may comprise an AlGaN spacer. The spacer layer 226 may be operable to 100-volt source-to-gate potential and up to approximately 20-watts per millimeter of source-to-gate separation. The spacer layer 226 may be positioned over an electron channel layer 228. The electron channel layer 228 may be positioned above a buffer layer 220. The buffer layer 220 may further be positioned over a diamond substrate 230. The power amplifier 200 may comprise at least one HEMT 224 and may comprise additional HEMTs 224 such as 8 to 30 HEMTs 224.

During operation, the hand-held nonlethal weapon 100 may produce heat. The diamond substrate 230 may serve to disperse heat from the power amplifier 200 and the constituent layers to passive heat sinks or active heat exchanger devices, as shown by arrows 232.

The power amplifier 200 may operate at a voltage of approximately 100V. Further, in some embodiments, the power amplifier 200 may operate with approximately 20 W/mm of gate width for each device. Nominal gate width may be approximately one millimeter and output power as high as 22.3 W has been reported for each device.

The power amplifier 200 may further comprise one or more source oscillators on a metamaterials layer 123, which may be in a juxtaposition ahead of the at least one HEMT 224 of the power amplifier layer 200 and consist of split ring resonators with an inductance-capacitance (L-C) equivalence of a tank circuit resonating at a desired frequency, such as 95 GHz. In some embodiments, the metamaterials output conditioner 125 may comprise concentric split-ring resonators to trap spurious harmonics and route that unwanted energy back to the input of the power amplifier 200 to substantially increase power-added efficiency (PAE) of the power amplifier 200. The output conditioner 125 may also comprise phase comparators to measure the relative phases of the parallel power amplifier outputs and phase shifters to synchronize all outputs to maximize coherence and PAE.

The beamformer 190 may be comprised of a metamaterial layer. The layer may be comprised of gold or graphene metal-coatings over vanadium dioxide on a silicon substrate. The metamaterial layer comprising the beamformer 190 may be comprised of any other anisotropic composite materials functioning in a similar manner, as described herein below.

The beamformer 190 may include a guided-wave structure known in the art as a substrate integrated waveguide (SIW). The SIW leaky-wave antenna may consist of four LWA elements (like a wheel with 8 spokes) that conform to the shape of the substrate and are fed by standard WR-28 waveguide. The SIW design is one of several candidates that are attractive due to their low loss, low cost, and ease of integration with metamaterial structures. In certain metamaterials composites combined with leaky-wave antennas, the 95 GHz wave velocity can and must exceed the velocity of light. The result is then leaky wave radiation rather than resonance propagation via an antenna. In this particular design, about 90% of the radiation will be released in a focused beam through the barrel 103 and the opening 103*a* and the remaining energy will be absorbed by matched loads at the end of the LSA elements. Further, the beamformer 190 with its LWA elements may be shielded from the exterior environment. The shielding may be operable to prevent the beamformer 190 and LWA from being exposed to environmental elements. The shielding will be described further herein below.

The beamformer 190 may in some embodiments comprise a composite metamaterial that is anisotropic. The beamformer 190 may comprise fishnet-shaped metal grids separated by a dielectric material such that the dimensions of the grid-like structure are less than 1 mm thick and with a grid pattern much smaller than the wavelength of the reactive deterrence beam (i.e., <<3.16 mm). Such a composite metamaterial may have both negative permeability and negative permittivity, and therefore negative refractive index in steering elements of the 95 GHz reactive deterrence beam. By varying the electric field across small sections of the metal grid and the magnetic field in the orthogonal direction across the grid, the angle of the 95 GHz beam can be precisely altered across the face of the beamformer 190 to change the overall beamwidth. The control drivers 110 (as shown in FIG. 1) may control the electric and magnetic fields according to the desired beamwidth that results in a physical beam diameter at the range of the target actor 102 that is 19 centimeters across at any range from 3 to 30 meters or that is more or less than 19 centimeters as selected by the operator.

Referring again to FIG. 1, the beamformer 120 may be operably coupled to a control driver 110 and may be in communication with the control driver 110, which will be explained further herein below. The control driver 110 may be operable to receive inputs from various sources and to provide instruction and direction to the beamformer 120 and its leaky wave antenna as to shape as well as size and the intensity of the beam of energy 104 as it radiates outward from the beamformer 120 toward an actor 102.

The beamformer 120 may be operable to form the beam of energy 104 in a form dictated by the systems of the hand-held nonlethal weapon 100. The beamformer 120 may form the beam of energy 104 such that beam of energy 104 is a focused beam capable of being directed at a specific portion of the body of actor 102. The beam of energy 104 may grow in size from its initial diameter of 2.65 cm or less. For example, as shown in FIG. 1, at a range “B” of between 3 and 30 meters from the opening 103*a*, the beam of energy 104 may have a diameter "A'" of approximately 19 cm at all ranges from 3 to 30 meters from the at least one opening. The beam diameter may be manually adjusted as discussed herein below.

In some embodiments, the beamformer 190, which may comprise a leaky wave antenna, may be covered by a hermetic seal or hermetic coating 121 on the barrel opening side of the hand-held nonlethal weapon 100. The hermetic seal 121 may prevent the passage of dust, dirt or moisture from the outside environment to the beamformer 120 and the other layers of the reactive deterrence subsystem. The hermetic seal 121 may comprise a clear epoxy hermetic seal or other type of appropriate hermetic seal, as known in the art.

In some embodiments, the hermetic seal 121 may comprise an outer portion of the beamformer 190 or may be separated from the beamformer 190. For example, in embodiments similar to those shown in FIG. 1, a hermetic seal 121 may be located at any forward location toward the front of the barrel 103, acting to protect and/or shield the beamformer 120 from any outside elements or environmental conditions. In further embodiments the hermetic seal 121 may be located adjacent to the beamformer 190. The hermetic seal 121 does not interfere with the propagation of the beam of energy 104.

As discussed herein above, further embodiments may include the control driver 110. The control driver 110 may comprise a memory and a processor for storing and processing collected data and information. The control driver 110 may be operable to receive inputs from various sources, as will be described herein below. The control driver 110 may further be in communication with and may be operably coupled to each of the subsystems and components previously described herein and those described herein below. For example, the control driver 110 may be operably coupled to the trigger 101*b*, the beam former 120, the power amplifier 119, and the battery 180, as well as other components described herein below. The control driver 110 may receive input from each of these components, process the data input, and send information and data to each of these components. For example, the control driver 110 may be operably coupled to the to the beamformer 120, including the leaky wave antenna, such that the control driver 110 provides instruction and support to the beamformer 120.

Further embodiments may include a data storage module 114. The data storage module 114 may comprise a solid-state memory device. The data storage 114 may be operable to store inputs from various sources, as will be described herein below. In addition, the data storage 114 may be operable to send data to various components of the hand-held nonlethal weapon 100, such as, for example, the control driver 110. The data may be used by the control driver 110 to create instructions to the beamformer 120.

An illustrative example of a method of use is provided herein. A user of the hand-held nonlethal weapon 100 may engage the trigger 101*b*. Engaging the trigger 101*b* may send a signal to the control driver 110 indicating that the trigger 101*b* has been pulled. Each pull of the trigger may initiate the nonlethal weapon 100 to produce beam 104, making the nonlethal service weapon 100 a semi-automatic nonlethal firearm in some embodiments.

The control driver 110 may be operable to use the received data to provide instruction to the power amplifier 119 and to the beamformer 120 that the beam of energy 104 is to be generated and formed. The beam of energy 104 may subsequently be released from the barrel opening 103*a*. The user of the hand-held nonlethal weapon 100 acts as the guidance system for the hand-held nonlethal weapon 100, pointing the hand-held nonlethal weapon 100 in the desired direction, often toward actor 102.

The hand-held nonlethal weapon 100 may produce a beam of energy 104 that is nonlethal in nature. The beam of energy may be directed to actor 102. The beam of energy 104 may further be directed to a specific region of the body of actor 102, such as the face, the chest, the arms, the right or left hand, or other area of the body of actor 102. The beam of energy 104 may further cause actor 102 to experience pain in the region of the body of actor 102 affected by the beam of energy 104. Upon contact from the beam of energy 104 to the specific region of the body of actor 102, actor 102 may experience pain in the form of extreme heat or other sharp and intense painful sensations. In some embodiments, the hand-held non-lethal weapon 100 may produce and reproduce the beam of energy 104 multiple times per second or multiple times over a period of seconds or minutes, depending upon the responses of actor 102. The duration of each pulse of energy may be set manually with a rotary knob 105 or other means to adjust duration, as will be recognized in the art, such as via a digital or electronic adjustment. In further embodiments, the duration of each pulse may be set to a default value or may be automatically determined based on environmental inputs.

The hand-held nonlethal weapon 100 may further comprise knob 105. Knob 105 may be used to manually adjust the pulse duration that any given beam of energy 104 may last. For example, the beam of energy 104 may have a pulse duration of 0.1 second to 1 second. Knob 105 may be coupled to the body 101 or the barrel 103 and may be operably coupled with the control driver 110. Control driver 110 may receive the setting from knob 105 and may then communicate the setting to the beamformer 120 and source 119 to form a beam having the proper duration. The duration may be adjusted using knob 105, or alternatively, in further embodiments may be adjusted using a digital interface. In yet further embodiments, the control driver 110 may adjust this setting automatically based on pre-programmed inputs. For example, the control driver 110 may be programmed to reduce the pulse duration after multiple beams of energy 104 are released at maximum duration.

Given the pulse duration setting (T in seconds) of knob 105 and the area of the beam at the target as set by the beam diameter (D in centimeters) of knob 105, the power output (P in watts) of the total beam of energy 104 may be adjusted automatically by the control driver 110 so that the total energy per square centimeter in Joules (J) deposited at the target never exceeds the maximum specified by the U.S. government as the maximum safe level. A past safe limit specified by the government for human skin was 1 Joule per 1 square centimeter within a 1-second period. The maximum duration of the beam's pulse is therefore given by the formula, T=(D^2)/(0.785P), or maximum power per square centimeter at the target is P=(D^2)/(0.785 T).

In all embodiments, the hand-held nonlethal weapon 100 may only deliver energy intensities and pulse durations that are determined to be well-below levels and durations that clinical trials have determined to be safe and free from any permanent injury. The beam of energy 104 may be directed to and targeted to different regions of the body of actor 102. The pain caused in actor 102 by the beam of energy 104 may cause actor 102 to cease whatever threat or action actor 102 is participating in. Further, it may cause actor 102 to retreat to a desired area. Further, the hand-held nonlethal weapon 100 may continue to produce the beam of energy 104 in order to maintain the retreated position of actor 102. The continued production of pulses of the beam of energy 104 may be prompted by the user depressing the trigger 101*b*. In further embodiments, the hand-held nonlethal weapon 100 may be programmed to cease producing the beam of energy 104 after a certain number of pulses fired within a specified time period.

In further embodiments, the hand-held nonlethal weapon 100 may comprise an adjustment knob 107. The adjustment knob 107 may be coupled to the body 101. The adjustment knob 107 may be operable to manually adjust the diameter of the beam of energy 104. The adjustment knob 107 may be operably coupled to the control driver 110 and to the data storage module 114. Any inputs from the adjustment knob 107 may be received and processed at the control driver 110, stored in the data storage module 114, and instruction may then be given to the beamformer 120 regarding the diameter of the beam of energy at the target, the target being a specified distance from the hand-held nonlethal service weapon 100.

In further embodiments, the hand-held nonlethal weapon 100 may have an automatic firing mode. The fully automatic mode may be activated by a user of the hand-held nonlethal weapon 100 by depressing and holding down trigger 101*b*. In the fully automatic mode, the beam 104 could be repeatedly released with a time interval between shots being set by a manual switch or permitted to fire at a maximum rate limited only by the time to re-charge the power supply 170.

The advantages of a fully-automatic mode would be evident when there are multiple bad actors. The re-charge delay might be sufficient to re-aim from target to target. If too rapid, the manual setting could slow the sequence.

In further embodiments, the hand-held nonlethal weapon 100 may comprise a "Ready Light" visible from the shooter's sighting of the weapon on the target. Such a feature may be applicable to both semi-automatic as well as in fully automatic embodiments.

Safety risks in fully automatic mode of the hand-held nonlethal weapon 100 are different than for a traditional fully-automatic firearm. For example, a fully-automatic firearm carries an inherent difficulty that the hand-held nonlethal weapon 100 does not experience—a "kick" or a "recoil" that takes the weapon off-target. While that effect is not present in the case of the hand-held nonlethal weapon 100, there is a time-delay in re-aiming from target-to-target that varies among users. This re-aiming necessity could increase the probability of striking a false target; however, the beam 104 is a nonlethal beam, and any false target exposure would represent only temporary pain and no permanent injury to a false target.

In further embodiments, the hand-held nonlethal weapon 100 may comprise a laser range finder 140. The laser range finder 140 may be coupled to the body 101 or the barrel 103. The laser range finder 140 may be operable to send a laser 142*a* toward a target, such as actor 102, and may further be operable to receive a laser 142*b*. Similar to other laser range finders known in the art, the laser range finder 140 may further include a computing device operable to compute the distance to the target based on the time required for laser 142*b* to return to the laser range finder 140, as is known in the art. The laser range finder 140 may be operably coupled to the data storage 114 and may pass the data containing the distance to the target to the data storage 114. The data storage 114 may communicate the distance data to the control driver 110. The control driver 110 may utilize the distance data to provide instruction to the power amplifier 200 and the beamformer 120 to create the beam of energy 104 such that beam of energy 104 has the appropriate strength for the range and adjusted size at the target's 102 range such that the beam is 19 cm in diameter or whatever size is selected when programming the weapon's computer 110. The laser 142*a* may be visible and may aid a user in aiming the hand-held nonlethal service weapon 100 at actor 102.

In further embodiments, the hand-held nonlethal weapon 100 may comprise a laser switch 143. The laser switch 143 may be operably coupled to the laser range finder 140 and may operable to manually activate the laser ranger finder 140. The laser switch 143 may be operably coupled with the laser ranger finder 140, operable to activate the laser range finder 140 upon engaging the laser switch 143, and operable to deactivate the laser range finder 140 upon disengaging the laser switch 143. The laser switch 143 may further be operably coupled to the control driver 110 and may send data to the control driver 110 regarding the on or off status of the laser range finder 140 and the laser switch 143. In further embodiments, the laser switch 143 may be a digital switch.

In further embodiments, the laser range finder 140 may be automatically engaged any time the hand-held nonlethal weapon 100 is settled upon a target for a fixed period of time. That period of time may be, for example, a short period of time, such as, for example, less than 0.25 seconds, or less than 0.5 seconds. The hand-held nonlethal weapon 100 may comprise a gyroscope or a gyrosensor to determine if there has been weapon movement. The gyroscope or the gyrosensor may be coupled to the control driver 110 and may process data received from the gyroscope or the gyrosensor and determine if the laser range finder should be actuated and subsequently send a signal to activate the laser range finder 140.

In further embodiments the hand-held nonlethal weapon 100 may include an acoustic sensor 150. Acoustic sensor 150 may be coupled to the body 101. Acoustic sensor 150 may be operable to record the audio signals that may occur during encounters while using the hand-held nonlethal weapon 100. The acoustic sensor 150 may be activated upon engaging the power-on safety switch 101*c*. In alternative embodiments, the acoustic sensor 150 may be activated by a timer, a gyroscope, or by manual means by a user. The acoustic sensor 150 may be operably coupled with and in communication with the data storage 114. The data storage 114 is operable to store the audio data captured by the acoustic sensor 150. Further, acoustic sensor 250 may be operably coupled or mounted on barrel 103 or body 101.

In some embodiments, the acoustic sensor 150 may be operably connected to the data storage 114. The data storage 114 may be operable to record the data containing the audible noises in the area around the hand-held nonlethal weapon 100. These noises may include, for example, words by the actor and the user(s) of the hand-held nonlethal weapon 100 for the purpose of legal documentation of the event, training purposes, etc.

In additional embodiments, the hand-held nonlethal weapon 100 may include an optical sensor 160. Optical sensor 160 may be operable to capture the optical signals that may occur during encounters while using the hand-held nonlethal weapon 100, such as the scene unfolding in front of and around a user. The optical sensor 160 may be activated upon engaging the power-on safety switch 101*c*. In alternative embodiments, the optical sensor 160 may be activated by a timer, a gyroscope or gyrosensor detecting weapon movement, or by manual means by a user. Further, in some embodiments the optical sensor 160 may comprise a motion sensor. Upon sensing motion, motion sensor may activate the optical sensor 160. The optical sensor 160 may be operably coupled with and in communication with the data storage 114. The data storage 114 may be operable to store the data from the audio sensor 160 and the data from the optical sensor 160. Further, optical sensor 160 may be operably coupled or mounted on barrel 103 or body 101.

In certain embodiments, the acoustic sensor 150 and the optical sensor 160 may be operable to record video and still images and audio to document events occurring before, during and after the hand-held nonlethal weapon is drawn, pointed at one or more actors, and fired for legal documentation and training purposes.

In further embodiments, the hand-held nonlethal weapon 100 may further be operable to communicate with a mobile electronic device 185. The mobile electronic device 185 may comprise any mobile electronic device, such as a smart phone, a cellular phone, a smart tablet, a laptop computer, a personal device assistant, and other similar devices. The hand-held nonlethal weapon 100 may communicate with the mobile electronic device 185 via a wireless link and associated hardware, as is known in the art. The hand-held-nonlethal weapon may comprise the hardware necessary to complete a wireless link with an external device. The wireless link may be facilitated by any suitable technology, such as for example Bluetooth, infrared wireless, ultra-wideband, induction wireless, near field communication, and so on.

Such a wireless link may facilitate communication from the hand-held nonlethal weapon 100 to the mobile electronic device 185. The hand-held nonlethal weapon 100 may transmit recorded video data, audio data, and data regarding the use of the hand-held nonlethal weapon 100, such as, for example the number of times a trigger has been pulled, the location of an actor, the performance of the hand-held nonlethal weapon 100 and other data gathered from the hand-held nonlethal weapon 100.

Further, the hand-held nonlethal weapon 100 may receive data from the mobile electronic device 185, such as for example, software downloads to fix bugs, change performance parameters to be in line with updated federal, state, and local laws where the user of the hand-held nonlethal weapon 100 resides or where the user may have traveled if the associated mobile electronic device is enabled by the user to provide that current location. The mobile electronic device 185 may be equipped with an application (an "app") operable to communicate with a central server 187, the central server 187 operable to receive and send data from the hand-held nonlethal weapon 100 via connection through the mobile electronic device 185. In further embodiments, the hand-held nonlethal weapon 100 may be operable to communicate directly with a central server 187, both sending and receiving data, via means known in the art.

The central server 187, may in some scenarios, send instruction to the hand-held nonlethal weapon 100 that would disable the reactive deterrence capability of the hand-held nonlethal weapon 100. This may occur in scenarios where the hand-held nonlethal weapon 100 is being misused. Misuse may include a violation of terms of use agreed to by the user at the time of acquiring the hand-held nonlethal weapon 100.

In further embodiments the hand-held nonlethal weapon 100 may be kept in a holster when not in use. The hand-held nonlethal weapon 100 and associated systems, such as the optical sensor 160, the acoustic sensor 150, the laser range finder 140, and so forth, may be automatically activated. Such activation may take place upon withdrawing the hand-held nonlethal weapon 100 from the holster. The activation of the hand-held nonlethal weapon 100 and other features thereof may be actuated by a mechanical or magnetically actuator switch on the barrel 103 that is set to OFF when the hand-held nonlethal weapon 100 is fully inserted in the holster and set to ON when it is withdrawn from the holster. The actuator switch may be operably coupled to the control driver 110 and may be actuated upon being withdrawn from the holster.

In further embodiments, the hand-held nonlethal weapon 100 may further be operable to be operated in a "practice" mode wherein the reactive deterrence function is inactivated, and a user may utilize the hand-held nonlethal weapon 100 for practice purpose only. The user may switch to practice mode (or vice-versa to active mode) by flipping switch 155. Switch 155 may be coupled to the control driver 110. Switch 155 may send a signal to control driver 110. Upon receiving a signal from the switch 155, the control driver 110, which may also be operably coupled to each component of the hand-held nonlethal weapon 100, including the power amplifier 119 and the beamformer 120, may shut off the power amplifier 119 and/or to the beamformer 120, thereby disabling the reactive deterrence capability of the hand-held nonlethal weapon 100 and allowing a user to utilize the hand-held nonlethal weapon in practice mode.

In practice mode, the laser range finder 140 may be active. When depressing the trigger 101*b* when in the inactive mode, the laser range finder 140 may be activated, allowing the user to practice aiming the hand-held nonlethal weapon 100.

Figure 4A:
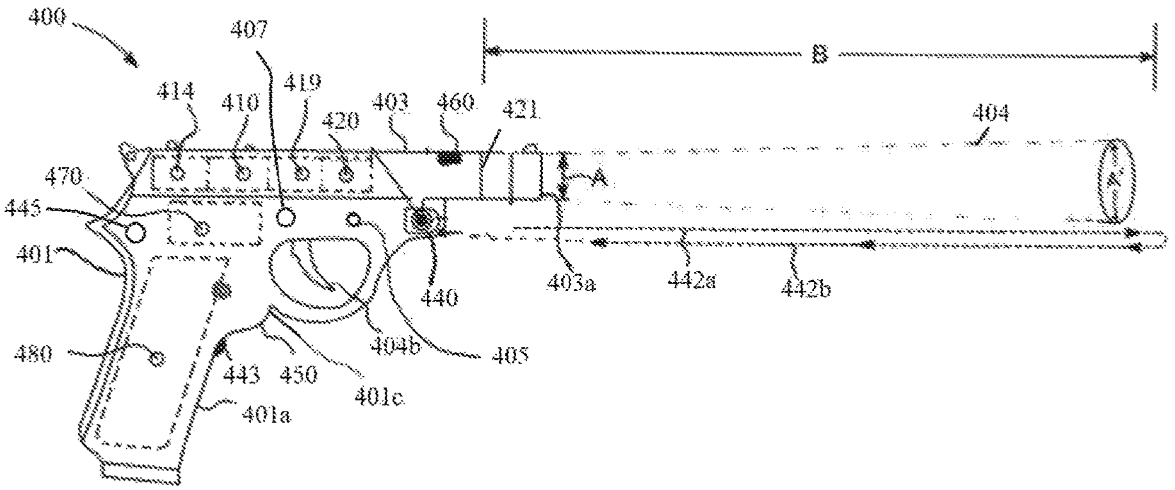
FIGS. 4*a* and 4*b* illustrate another embodiment of the hand-held nonlethal weapon.
Figure 4B:
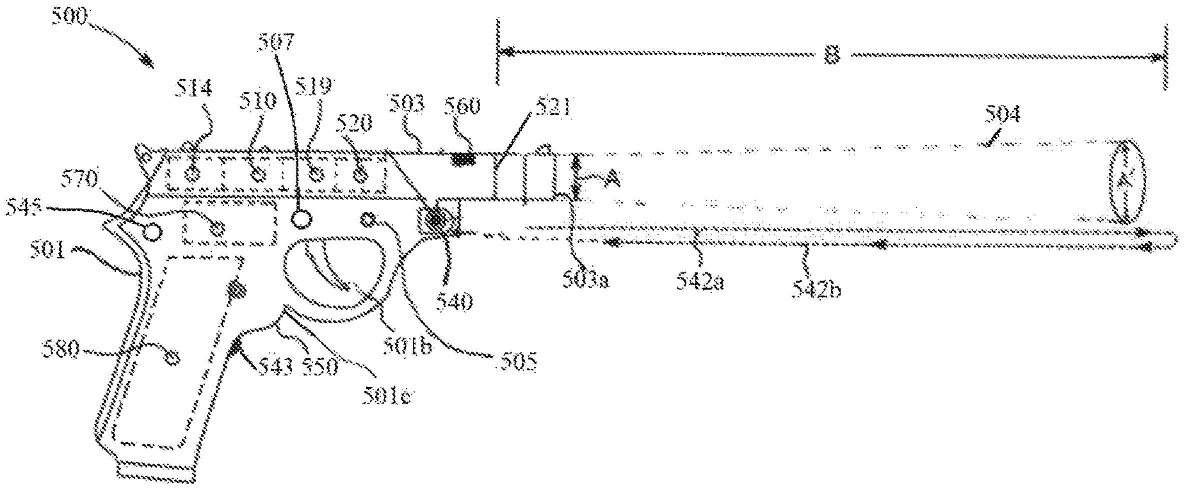

FIGS. 4*a* and 4*b* illustrate a further embodiment of the hand-held nonlethal weapon. FIGS. 4*a* and 4*b* illustrate a pair of hand-held nonlethal weapons, which are similar in all respects to the embodiment of a hand-held nonlethal weapon illustrated in FIG. 1. As illustrated, each has a body, a barrel, etc., and will be described in complete detail below. The hand-held nonlethal weapon 400, illustrated in FIG. 4*a*, may also comprise a sending unit 445. Sending unit 445 may be operable to send a signal to certain hand-held nonlethal weapons, such as those illustrated in FIG. 4*b*, as will be explained herein below. The sending unit 445 may be operably connected with the body 401 and may further be operably connected with control driver 410, which may control the signal and output sent to other hand-held nonlethal weapons. The signal sent from the hand-held nonlethal weapon 400 may be an electromagnetic signal and may be of a strength to be reliably received by hand-held nonlethal weapon 500 at a line-of-sight distance of at least approximately 200 meters.

FIG. 4*b* illustrates a hand-held nonlethal weapon 500 which is similar to the hand-held nonlethal weapon of FIG. 1, as will be explained herein below. In additional embodiments, the hand-held nonlethal weapon 500 also may comprise a receiving unit 545. The receiving unit 545 may be operable to receive a signal from certain hand-held nonlethal weapons, such as the hand-held nonlethal weapon 400, as illustrated in FIG. 4*a*. The receiving unit may be operably connected to the body 501 and may further be operably connected with the control driver 510 of the hand-held nonlethal weapon 500. Upon receiving the signal from the hand-held nonlethal weapon 400, the control driver 510 may render the hand-held nonlethal weapon inoperable for a prescribed period of time. In further embodiments, the hand-held nonlethal weapon 500 may be operable to receive a signal from any device operable to send a compatible signal. Such devices may include a mobile electronic communications device, such as a smart phone, tablet, computer or other similar device, as well as by receiving instruction directly from a central server. The hand-held nonlethal weapon 500 may be rendered inoperable by any or all of the aforementioned methods. Such safeguards may be put in place with the intent of preventing average citizens from misuse of the hand-held nonlethal weapons. In practical application, the hand-held nonlethal weapon 400 may be a weapon used by law enforcement officials, while the hand-held nonlethal weapon 500 may be used by private citizens.

As indicated above, the detail surrounding the embodiments of FIGS. 4*a* and 4*b* is described herein. FIG. 4*a* illustrates an embodiment of the hand-held nonlethal weapon, in particular, FIG. 4*a*, which illustrates a hand-held nonlethal weapon 400. The hand-held nonlethal weapon 400 may act to deter an actor or actors. Such an actor may pose some type of threat to a population or to an individual, such as a violent threat.

The hand-held nonlethal weapon 400 may comprise several subsystems that act in cooperation to deter actor(s) and to document the encounter. The hand-held nonlethal weapon 400 may comprise a body 401. The body 401 may comprise any suitable material, such as a plastic, a hard plastic, a composite material, a carbon composite material, metal or other suitable material. The body 401 may be operable to store multiple components and subsystems described herein. The hand-held nonlethal weapon 401 may further comprise a barrel 403 operably coupled to the body 401. The body 401 may comprise a trigger 401*b* operably coupled to the body 401. The trigger 401*b* may be operable to be engaged by a user. The trigger 401*b* may initiate the creation of a reactive deterrence beam, as discussed herein below.

In some embodiments, body 401 may further comprise a power-on safety switch 401*c*. The power-on safety switch 401*c* may be operable to activate the various subsystems described herein below upon being engaged. The power-on safety switch 401*c* may be operably connected to each of the subsystems described herein below, such that each of the subsystems may become operable upon engaging the power-on safety switch 401*c* or may become operable upon engaging the power-on safety switch 401*c* in combination with an additional activation protocol, which will be discussed herein below. The power-on safety switch 401*c* may be engaged by the hand of a user gripping the body 101 and the safety switch 401*c* may be mounted on the front or rear side of the handle 401.

The barrel 403 may comprise opening 403*a*. In some embodiments, the barrel opening 403*a* may have an inner diameter "A" of 2.65 centimeters (cm). In further embodiments, the barrel opening 403*a* inner diameter may be smaller than 2.65 cm, such as for example, between 1 cm and 2.65 cm. In further embodiments, the barrel opening 403*a* inner diameter may be larger, such as, for example, 2.65 cm to 4.0 cm. The purpose of the barrel 403 is only to aid private individuals or law enforcement personnel in aiming the hand-held nonlethal weapon 100 in a similar manner as with handguns with which they may be more acquainted. The primary aiming procedure may use a laser range finder 440 that is activated when the user pulls the trigger 401*b* half-way back producing the outgoing laser beam 442*a*. To aim the hand-held nonlethal weapon 400 precisely, the user must observe the laser beam 442*a* at the target 402 and move the weapon such that the beam 442*b* reflected by the target is from a central location high on the target's chest near the base of the neck. Aiming the weapon 400 using the barrel 403 is only a non-essential step. Therefore, in further embodiments, the barrel 403 may be shortened or removed entirely.

The hand-held nonlethal weapon 400 of FIG. 4*a* may further comprise a battery 480. The battery 480 may be located within the body 401 and may be operably coupled to the trigger 401*b*. In some embodiments the battery 480 may be a rechargeable battery. The battery 480 may be a nickel-metal hydride battery, or other suitable rechargeable battery. The battery 480 may be operably coupled to and may be operable to provide power to all subsystems and components of the hand-held nonlethal weapon 400 that require power to operate. The battery 480 may be positioned within the body 401 and may be operably coupled to the body 401 such that the hand-held nonlethal weapon 400 may be moved and carried in a manner similar to other personal or service weapons.

In further embodiments, the hand-held nonlethal weapon 400 may comprise a power supply 470. The power supply 470 may be coupled to the body 401 and may be operably coupled to the battery 480. The battery 480 may be operable to provide power to the power supply 470. The power supply 470 may be operably coupled to and may be operable to provide various voltages at various levels to all electronic subsystems and components of the hand-held nonlethal weapon 400 that require power to operate.

The hand-held nonlethal weapon 400 may further comprise a power amplifier 419. The power amplifier 419 may be operably coupled to the power supply 470, which may be operable to supply power to the power amplifier 419. The power amplifier 419 may be operable to create a nonlethal beam, such as beam 104, as discussed herein below.

The hand-held nonlethal weapon 400 of FIG. 4*a* may further comprise a beamformer 420. The beamformer 420 may be coupled to the barrel 403 of the hand-held nonlethal weapon 400. The beamformer 420 may be operable to form, with the power amplifier 419, a reactive deterrence beam 404, which may be projected from the hand-held nonlethal weapon 100 through the opening 403*a*. In some embodiments, the reactive deterrence beam 404 may be projected in the direction of an actor and the reactive deterrence beam 404 may contact an actor in the face, hands, arms, chest, or other portion of the body of an actor. The beamformer 420 may comprise metamaterial devices or layers, as will be described herein below.

FIG. 2*a* illustrates in further detail a beamformer, a power amplifier, and related components. FIG. 2*a* illustrates a beamformer 190. Beamformer 190 may be represent any beamformer discussed herein, such as beamformer 420, shown in FIG. 4*a*. As related to other embodiments, beamformer 190 may represent other beamformers found in other embodiments. Power amplifier 200 may represent any power amplifier as discussed herein, such as power amplifier 419, as shown and described in FIG. 4*a*. The functionality of the power amplifier 419 and the beamformer 420 is described herein above as it relates to power amplifier 200 and to beamformer 190, respectively. The function and production of the beam 404, therefore, has been discussed herein with regard to other embodiments. The same principles described previously regarding the production of beams of energy and the function and operation of the power amplifier and beamformer apply to the beam of energy 404, power amplifier 419, and beamformer 420 and therefore will not be described in detail.

Referring again to FIG. 4*a*, the beamformer 420 may be operably coupled to a control driver 410 and may be in communication with the control driver 410, as will be explained further herein below. The control driver 410 may be operable to receive inputs from various sources and to provide instruction and direction to the beamformer 420 and its leaky wave antenna (LWA) as to shape as well as size and the intensity of the beam of energy 404 as it radiates outward from the beamformer/LWA 420 toward an actor so as to expose an actor or target with the specified energy in watts per square centimeter throughout the specified circle regardless of the measured range to the actor or target.

The control driver 410 may be operable to provide instruction and direction to the beamformer/LWA 420 and its leaky wave antenna as to the beamwidth of the beam of energy 404 so as to expose an actor or target with the specified energy in watts per square centimeter throughout the specified circle regardless of the measured range to the actor or target.

The beamformer 420 may be operable to form the beam of energy 404 in a form dictated by the systems of the hand-held nonlethal weapon 400. The beamformer 420 may form beam of energy 404 such that beam of energy 404 is a focused beam capable of being directed at a specific portion of the body of an actor. The beam of energy 404 may grow in size from its initial diameter of 2.65 cm or less inside the barrel 403 to a diameter at the actor or target selected by the user with a switch on the side of the barrel.

In some embodiments, the beamformer/LWA 490, which may comprise a leaky wave antenna, may be covered by a hermetic seal or hermetic coating 421 on the barrel opening side of the hand-held nonlethal weapon 400. The hermetic seal 421 may prevent the passage of dust, dirt or moisture from the outside environment to the beamformer 420 and the other layers of the reactive deterrence subsystem. The hermetic seal 421 may comprise a clear epoxy hermetic seal or other type of appropriate hermetic seal, as known in the art.

In some embodiments, the hermetic seal 421 may comprise an outer portion of the beamformer 420 or may be separated from the beamformer 420. For example, in embodiments similar to those shown in FIG. 4, a hermetic seal 421 may be located at any forward location toward the front of the barrel 403, acting to protect and/or shield the beamformer 420 from any outside elements or environmental conditions. The hermetic seal 421 does not interfere with the propagation of the beam of energy 404.

Further embodiments may include a control driver 410. The control driver 410 may comprise a memory and a processor for storing and processing collected data and information. The control driver 410 may be operable to receive inputs from various sources, as will be described herein below. The control driver 410 may further be in communication with and may be operably coupled to the beamformer 420, the power amplifier 419, the battery 480, the power supply 470 as well as other components described herein below. The control driver 410 may receive input from each of these components, process the data, and send information and instruction to each of these components. For example, the control driver 410 may be operably coupled to the beamformer 420, such that the control driver 410 provides instruction and support to the beamformer 420

Further embodiments may include a data storage module 414. The data storage module 414 may comprise a solid-state memory device. The data storage 414 may be operable to store inputs from various sources, as will be described herein below. In addition, the data storage 414 may be operable to send data to various components of the hand-held nonlethal weapon 400, such as, for example, the control driver 410. The data may be used by the control driver 410 to create instructions to the beamformer 420.

The control driver 410 may be operable to use the received data to provide instruction to the power amplifier 419 and to the beamformer/LWA 420 that the beam of energy 404 is to be generated and formed. The beam of energy 404 may subsequently be released from the barrel opening 403*a*. The user of the hand-held nonlethal weapon 400 acts as the guidance system for the hand-held nonlethal weapon 400, pointing the hand-held nonlethal weapon 400 in the desired direction, often toward an actor or toward actors.

The hand-held nonlethal weapon 400 may produce a beam of energy 404 that is nonlethal in nature. The beam of energy may be directed to an actor or to actors. The beam of energy may further be directed to a specific region of the body of an actor, such as the face, the chest, the arms, the right or left hand, or other area of the body of an actor. The beam of energy 104 may further cause the actor to experience pain in the region of the body of the actor affected by the beam of energy 404. Upon contact from the beam of energy 404 to the specific region of the body of the actor, the actor may experience pain in the form of extreme heat or other sharp and intense painful sensations. In some embodiments, the hand-held nonlethal weapon 400 may produce and reproduce the beam of energy 404 multiple times per second or multiple times over a period of seconds or minutes, depending upon the responses of the actor or actors. The duration of each pulse of energy may be set manually with a rotary knob 105 or other means to adjust duration, as will be recognized in the art, such as via a digital or electronic adjustment. In further embodiments, the duration of each pulse may be set to a default value or may be automatically determined based on environmental inputs.

The hand-held nonlethal weapon 400 may comprise knob 405. Knob 405 may be used to manually adjust the pulse duration any given beam of energy 404 may last. For example, the beam of energy 404 may have a pulse duration of 0.1 second to 1 second. Knob 405 may be coupled to the body 401 or the barrel 403 and may be operably coupled with the controller driver 410 and the data storage module 414. Control driver 410 may receive the setting from knob 405, process the data into a command, and may then communicate the setting and corresponding command to the beamformer 420 and the power amplifier 419 to form a beam having the proper duration. The duration may be adjusted using knob 405, or alternatively, in further embodiments, may be adjusted using a digital interface, or may be remotely adjusted through a wireless interface from a central server or a mobile electronic device. In yet further embodiments, the control driver 410 may adjust this setting based on preprogrammed inputs. For example, the control driver 410 may be programmed to reduce the pulse duration after multiple beams of energy 404 are released at maximum duration. Given the pulse duration setting (T in seconds) of knob 405 and the area of the beam at the target as set by the beam diameter (D in centimeters) of knob 405, the power output (P in watts) of the total beam of energy 404 may be adjusted automatically by the control driver 110 so that the total energy per square centimeter in Joules (J) deposited at the target never exceeds the maximum specified by the U.S. government as the maximum safe level. A past safe limit specified by the government for human skin was 1 Joule per 1 square centimeter within a 1-second period. The maximum duration of the beam's pulse is therefore given by the formula, $T=(D\hat{}2)/(0.785P)$, or maximum power per square centimeter at the target is $P=(D\hat{}2)/(0.785\ T)$. In all embodiments, the hand-held nonlethal weapon 400 can only deliver energy intensities and pulse durations that are determined to be well-below levels and durations that clinical trials have determined to be safe and free from any permanent injury.

The beam of energy 404 may be directed to and targeted to different regions of the body of the actor. The pain caused in or to the actor by the beam of energy 404 may cause the actor or actors to cease whatever threat or action the actor or actors is/are participating in. Further, it may cause actor 402 to retreat to a desired area. Further, the hand-held nonlethal weapon 400 may continue to produce the beam of energy 404 in order to maintain the retreated position of actor 402. The continued production of pulses of the beam of energy 404 may be prompted by the user depressing the trigger 401*b*. In further embodiments, the hand-held nonlethal weapon 400 may be programmed to cease producing the beam of energy 404 after a certain number of pulses fired within a specified time period.

In further embodiments, the hand-held nonlethal weapon 400 may comprise an adjustment knob 407. The adjustment knob 407 may be coupled to the body 401. The adjustment knob 407 may be operable to manually adjust the diameter of the beam of energy 404 at the range of the target. The adjustment knob 407 may be operably coupled to the control driver 410 and to the data storage module 414. Any inputs from the adjustment knob 407 may be received and processed at the control driver 410, stored in the data storage module 414, and instruction may then be given to the beamformer/LWA 420 regarding the diameter of the beam of energy at the target, the target being a specified distance from the hand-held nonlethal weapon 400.

In further embodiments, the hand-held nonlethal weapon 400 may have an automatic mode. The fully automatic mode may be activated by a user of the hand-held nonlethal weapon 400 by depressing and holding down trigger 401*b*. In the fully automatic mode, the beam 404 could be repeatedly released with a time interval between shots being set by a manual switch or permitted to fire at a maximum rate limited only by the time to re-charge the power supply 470.

The advantages of a fully automatic mode would be evident when there are multiple bad actors. The re-charge delay might be sufficient to re-aim from target to target. If too rapid, the manual setting could slow the sequence.

In further embodiments, the hand-held nonlethal weapon 400 may comprise a "Ready Light" visible from the shooter's sighting of the weapon on the target. Such a feature may be applicable to both semi-automatic as well as in fully automatic embodiments.

Safety risks in fully automatic mode of the hand-held nonlethal weapon 100 are different than for a traditional fully automatic firearm. For example, a fully-automatic firearm carries an inherent difficulty that the hand-held nonlethal weapon 400 does not experience—a "kick" or a "recoil" that takes the weapon off-target. While that effect is not present in the case of the hand-held nonlethal weapon 400, there is a time-delay in re-aiming from target-to-target that varies among users. This re-aiming necessity could increase the probability of striking a false target; however, the beam 404 is a nonlethal beam, and any false target exposure would represent only temporary pain to a false target.

In further embodiments, the hand-held nonlethal weapon 400 may comprise a laser range finder 440. The laser range finder 440 may be coupled to the body 401 or to the barrel 403. The laser range finder 440 may be operable to send a laser 442*a* toward a target, such as actor 402, and may further be operable to receive a reflected laser signal 442*b*. Similar to other laser range finders known in the art, the laser range finder 440 may further include a computing device operable to compute the distance to the target based on the time required for laser 442*b* to return to the laser range finder 440, as is known in the art. The laser range finder 440 may be operably coupled to the data storage 414 and may pass the data containing the distance to the target to the data storage 414. The data storage 414 may communicate the distance data to the control driver 410. The control driver 410 may utilize the distance data to provide instruction to the power amplifier 200 and the beamformer 420 to create the beam of energy 404 such that beam of energy 404 has the appropriate strength for the range and adjusted size at the target 402 range such that the beam is 19 cm in diameter or whatever size is selected when programming the weapon's computer 410. The laser 442*a* may be visible and may aid a user in aiming the hand-held nonlethal weapon at a target or actor.

In some embodiments, the laser range finder 440 may transmit a secondary laser comprising a circular pattern of green laser dots at the target when the trigger 401*b* is fully pulled in normal operation or in practice mode at the same instant in time at which the reactive deterrence beam is transmitted or would have been transmitted in practice mode. The secondary laser may comprise a separate metamaterials source and a separate power amplifier than those described herein previously. Such a metamaterials source and power amplifier would produce a single or multiple laser that are in the visual spectrum of electromagnetic radiation and have a metamaterials layer for the green wavelength to guide small laser beams, such as 25 to 100 small laser beams, that perfectly define the invisible reactive deterrence beam, or the area where a reactive deterrence beam would reach if operating in practice mode.

Alternatively, such a circular pattern of green "guidance" laser may be generated and divided up and precisely guided by a metamaterials beamformer operating in the green portion of the visual spectrum. In either case, the secondary laser system would be couple to the control driver 410 and be activated upon the activation of the trigger 401*b* or upon the activation a dedicated switch or input sending a signal to the control driver 410, which subsequently sends a signal to the secondary laser system.

In further embodiments, the hand-held nonlethal weapon 400 may comprise a laser switch 443 coupled to the body 401. The laser switch 443 may be operable to manually activate the laser ranger finder 440. The laser switch 443 may be operably coupled with the laser ranger finder 440, operable to activate the laser range finder 440 upon engaging the laser switch 443, and operable to deactivate the laser range finder 440 upon disengaging the laser switch 443. The laser switch 143 may further be operably coupled to the control driver 410 and may send data to the control driver 410 regarding the on or off status of the laser range finder 440 and the laser switch 443. In further embodiments the laser switch 443 may be a digital switch.

In further embodiments, the laser range finder 440 may be automatically engaged any time the hand-held nonlethal weapon is settled upon a target for a fixed period of time. That period of time may be, for example, a short period of time, such as, for example, less than 0.25 seconds, or less than 0.5 seconds.

In further embodiments, the hand-held nonlethal weapon 400 may include an acoustic sensor 450. The acoustic sensor 450 may be coupled to the body 401. Acoustic sensor 450 may be operable to record the audio signals that may occur during encounters while using the hand-held nonlethal weapon 400. The acoustic sensor 450 may be activated upon engaging the power-on safety switch 401*c*. In alternative embodiments, the acoustic sensor 450 may be activated by a timer, a gyroscope, or by manual means by a user. The acoustic sensor 450 may be operably coupled with and in communication with the data storage 414. The data storage 414 is operable to store the audio data captured by the acoustic sensor 450. Further, acoustic sensor 450 may be operably coupled or mounted on barrel 403 or body 401.

In some embodiments, the acoustic sensor 450 may be operably connected to the data storage 414. The data storage 414 may be operable to record the data containing the audible noises in the area around the hand-held nonlethal weapon 400. These noises may include, for example, words by the actor and the user(s) of the hand-held nonlethal weapon 100 for the purpose of legal documentation of the event, training purposes, etc.

In additional embodiments, the hand-held nonlethal weapon 400 may include an optical sensor 460. Optical sensor 460 may be operable to record the optical signals that may occur during encounters while using the hand-held nonlethal weapon 400, such as the scene unfolding in front of and around a user. The optical sensor 460 may be activated upon engaging the power-on safety switch 101*c*. In alternative embodiments, the optical sensor 460 may be activated by a timer, a gyroscope, or by manual means by a user. Further, the optical sensor a 460 may comprise a motion sensor. Upon sensing motion, the motion sensor may activate the optical sensor 460. The optical sensor 460 may be operably coupled with and in communication with the data storage 414. The data storage 414 may be operable to store the data from the audio sensor 450 and data from the optical sensor 460. Further, optical sensor 460 may be operably coupled or mounted on barrel 403 or body 401.

In certain embodiments, the optical sensor 460 may be operable to record video and document events occurring before, during and after the hand-held nonlethal weapon is drawn, pointed at one or more actors, and fired for legal documentation and training purposes.

In further embodiments, the hand-held nonlethal weapon 400 may further be operable to communicate with mobile electronic devices, such as a smart phone, a cellular phone, a smart tablet, a laptop computer, a personal device assistant, and other similar devices. The hand-held nonlethal weapon 400 may communicate with mobile electronic devices via a wireless link. The hand-held-nonlethal weapon may comprise the hardware necessary to complete a wireless link with an external device. The wireless link may be facilitated by any suitable technology, such as for example Bluetooth, infrared wireless, ultra-wideband, induction wireless, near field communication, and so on.

Such a wireless link may facilitate communication from the hand-held nonlethal weapon 400 to a mobile electronic device. The hand-held nonlethal weapon may transmit recorded video data, audio data, and data regarding the use of the hand-held nonlethal weapon 400, such as, for example the number of times a trigger has been pulled, the location of an actor, the performance of the hand-held nonlethal weapon 400 and other data gathered from the hand-held nonlethal weapon 400.

Further, the hand-held nonlethal weapon 400 may receive data from a mobile electronic device, such as for example, software downloads to fix bugs, change performance parameters to be in line with updated federal, state, and local laws where the user of the hand-held nonlethal weapon 400 resides or where the user may have travel if the associated mobile electronic device is enabled by the user to provide the current location. The mobile electronic device may be equipped with an application (an "app") operable to communicate with a central server, the central server operable to receive and send data from the hand-held nonlethal weapon 400 via connection through the mobile electronic device. In further embodiments, the hand-held nonlethal weapon 400 may be operable to communicate directly with a central server, both sending and receiving data, via means known in the art.

The central server, may, in some scenarios, send instruction to the hand-held nonlethal weapon 400 that would disable the reactive deterrence capability of the hand-held nonlethal weapon 400. This may occur in scenarios where the hand-held nonlethal weapon 400 is being misused. Misuse may include a violation of terms of use agreed to by the user at the time of acquiring the hand-held nonlethal weapon 400.

In further embodiments the hand-held nonlethal weapon 400 may be kept in a holster and automatically deactivated when not in use. The hand-held nonlethal weapon 400 and associated systems, such as the acoustic sensor 450, the optical sensor 460, the laser range finder 440, and so forth, may be automatically activated. Such activation may take place upon withdrawing the hand-held nonlethal weapon 400 from the holster. The activation of the hand-held nonlethal weapon 400 and other features thereof may be actuated by removing the weapon from the holster. In further embodiments, the hand-held nonlethal weapon 400 may be kept in a holster and automatically deactivated when not in use. The hand-held nonlethal weapon 100 and associated systems, such as the optical sensor 160, the acoustic sensor 150, the laser range finder 140, and so on, may be automatically activated. Such activation may take place upon withdrawing the hand-held nonlethal weapon 400 from the holster. The activation of the hand-held nonlethal weapon 400 and other features thereof may be actuated by a mechanical or magnetically actuated switch on the barrel 403 that is set to OFF when the weapon is fully inserted in the holster and set to ON when it is withdrawn from the holster.

In further embodiments, the hand-held nonlethal weapon 400 may further be operable to be operated in a "practice" mode wherein the reactive deterrence function is inactivated, and a user may utilize the hand-held nonlethal weapon 400 for practice purpose only. The user may switch to practice mode (or vice-versa to active mode) by flipping switch 455. Switch 455 may be coupled to the control driver 410. Switch 455 may send a signal to control driver 410. Upon receiving a signal from the switch 455, the control driver 410, which may also be operably coupled to each component of the hand-held nonlethal weapon 400, including the power amplifier 419 and the beamformer 420, may shut off the power amplifier 419 and/or to the beamformer/LWA 420, thereby disabling the reactive deterrence capability of the hand-held nonlethal weapon 400 and allowing a user to utilize the hand-held nonlethal weapon in practice mode.

In further embodiments, the laser site may also be activated while in active mode to either assist a user in aiming the hand-held nonlethal weapon 400 while in use and to provide feedback data to the user and to the hand-held nonlethal weapon 400, specifically to the control driver 410, which may be communicated to a mobile electronic device, and subsequently to a central server, or in other embodiments, such data may be transferred directly to the central server.

The embodiment illustrated in FIG. 4*b* is identical in all respects to the embodiment of FIG. 4*a*, except with respect to the sending unit 445 in FIG. 4*a*, which is replaced with a receiving unit 545, as described herein above. The embodiment illustrated in FIG. 4*b* comprises the following: a hand-held nonlethal weapon 500, body 501, trigger 501*b*, power-on safety switch 501*c*, barrel 503, barrel opening 503*a*, beam of energy 504, pulse width knob 505, adjustment knob 507, control driver 510, data storage 514, power amplifier 519, beamformer 520, hermetic seal 521, laser ranger finder 540, outgoing laser 542*a* and incoming laser signal 542*b*, laser switch 543, receiving unit 545, acoustic sensor 550, optical sensor 560, power supply 570, and battery 580. Each of these elements is operable to operate in a manner identical to similar elements as described in FIG. 4*a*, with the exception of receiving unit 545, which has been described herein previously.

Figure 5A:
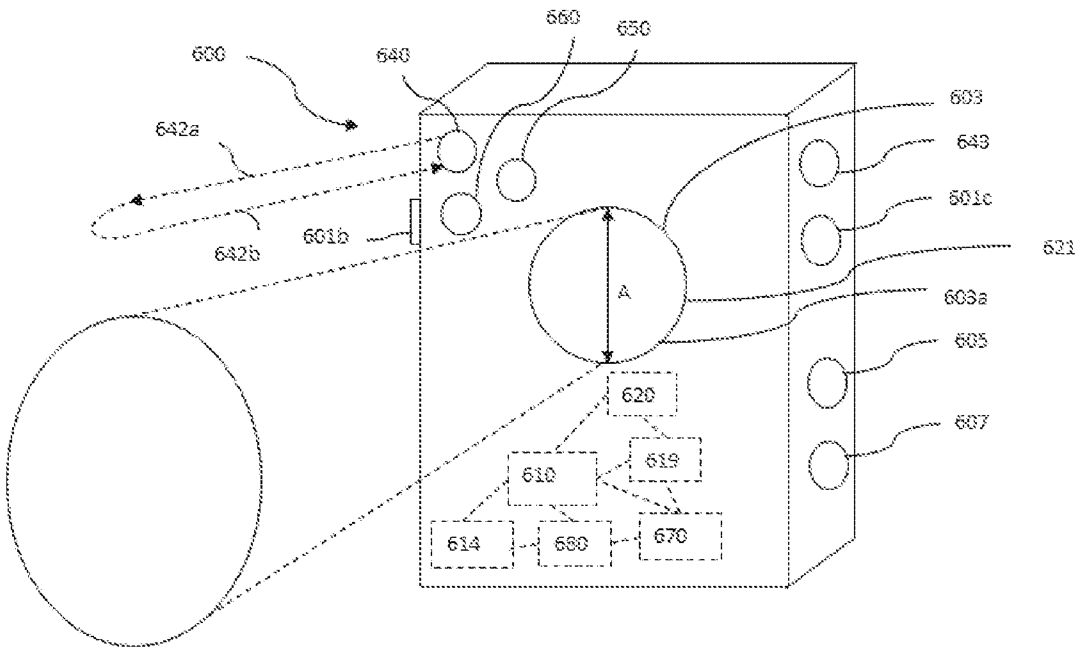
FIGS. 5*a* and 5*b* illustrate another embodiment of the hand-held nonlethal weapon.

Further embodiments of the present invention are illustrated in FIG. 5. FIG. 5 illustrates a hand-held nonlethal weapon 600. The hand-held nonlethal weapon 600 may comprise elements similar to other embodiments described herein above. Specifically, the hand-held nonlethal weapon 600 may act to deter an actor. The actor or actors may pose some type of threat to a population or to an individual, such as a violent threat.

The hand-held nonlethal weapon 600 may comprise several subsystems that act in cooperation to deter an actor and to document the encounter. The hand-held nonlethal weapon 600 may comprise a body 601. The body 601 may comprise any suitable material, such as a plastic, a hard plastic, a composite material, a carbon composite material, metal, or other suitable material. The body 601 may comprise a body 601*a* and a trigger switch 601*b* operably coupled to the body 601. The trigger switch 601*b* may be operable to be engaged by a user. The trigger switch 601*b* may initiate the creation of a reactive deterrence beam, as discussed herein below.

In some embodiments, body 601 may further comprise a power-on safety switch 601*c*. The power-on safety switch 601*c* may be operable to activate the various subsystems described herein below upon being engaged. The power-on safety switch 601*c* may be operably connected to each of the subsystems described herein below, such that each of the subsystems may become operable upon engaging the power-on safety switch 601*c* or may become operable upon engaging the power-on safety switch 601*c* in combination with an additional activation protocol, such as withdrawal from a holster, which will be discussed herein below. The power-on safety switch 601*c* may be engaged by the hand of a user gripping the body 601 and the safety switch 601*c* may be mounted on a side of the handle 601.

The body 601 may further comprise a barrel 603. The barrel 603 may be a short barrel, having a length less than that of the width of the body 601. Further the barrel 603 may not extend past the body 601, with the end of the barrel 603 being flush with the body 601. In some embodiments, the barrel 603 may be considered to be merely an opening in the body 601 to facilitate the use of the hand-held nonlethal weapon 600.

The barrel 603 may comprise opening 603*a*. In some embodiments, the barrel opening 603*a* may have an inner diameter "A" of 2.65 centimeters (cm). In further embodiments, the barrel opening 603*a* inner diameter may be smaller than 2.65 cm, such as for example, between 1 cm and 2.65 cm. In further embodiments, the barrel opening 603*a* inner diameter may be larger, such as, for example, 2.65 cm to 4.0 cm.

The hand-held nonlethal weapon 600 of FIG. 5 may further comprise a battery 680. The battery 680 may be located within the body 601 and may be operably coupled to the trigger 601*b*. In some embodiments the battery 680 may be a rechargeable battery. The battery 680 may be a nickel-metal hydride battery, or other suitable rechargeable battery. The battery 680 may be operably coupled to and may be operable to provide power to all subsystems and components of the hand-held nonlethal weapon 600 that require power to operate. The battery 680 may be positioned within the body 601 and may be operably coupled to the body 601 such that the hand-held nonlethal weapon 600 may be moved and carried in a manner similar to other personal or service weapons.

In further embodiments, the hand-held nonlethal weapon 600 may comprise a power supply 670. The power supply 670 may be coupled to the body 601 and may be operably coupled to the battery 680. The battery 680 may be operable to provide power to the power supply 670. The power supply 670 may be operably coupled to and may be operable to provide various voltages at various levels to all electronic subsystems and components of the hand-held nonlethal weapon 600 that require power to operate.

The hand-held nonlethal weapon 600 may further comprise a power amplifier 619. The power amplifier 619 may be operably coupled to the power supply 670, which may be operable to supply power to the power amplifier 619. The power amplifier 619 may be operable to create a nonlethal beam, such as beam 604, as discussed herein below.

The hand-held nonlethal weapon 600 of FIG. 5 may further comprise a beamformer 620. The beamformer 620 may be coupled to the body 601 of the hand-held nonlethal weapon 600. The beamformer 620 may be operable to form a reactive deterrence beam 604, which may be projected from the hand-held nonlethal weapon 600. In some embodiments, the reactive deterrence beam 604 may be projected in the direction of actor 602 and the reactive deterrence beam 604 may contact actor 602 in the face, hands, arms, chest, or other portion of the body of actor 602. The beamformer 620 may comprise metamaterial devices or layers, as will be described herein below.

FIG. 2*a* illustrates in further detail a beamformer, a power amplifier, and related components. FIG. 2*a* illustrates a beamformer 190. Beamformer 190 may be represent any beamformer discussed herein, such as beamformer 620, shown in FIG. 5. As related to other embodiments, beamformer 190 may represent other beamformers found in other embodiments. Power amplifier 200 may represent any power amplifier as discussed herein, such as power amplifier 719, as shown and described in FIG. 5.

As illustrated in the detail of FIG. 2*a*, the beamformer 190 may be operably coupled to a power amplifier 200 illustrated in the detail of FIG. 2*b* via an output conditioning network 125 in FIG. 2A. The power amplifier 200 may be operable to increase the output signal. Working with the beamformer 190, the reactive deterrence power amplifier 200 may be operable to create the reactive deterrence beam 604. The power amplifier 200 may comprise an array of high electron mobility transistors (HEMT). HEMT, also known as heterostructure field effect transistors or modulation doped transistors, incorporate a junction between at least two materials having different band gaps at the channel instead of the doped region. Typically, these are used to provide high levels of performance at microwave frequencies, including very high frequencies with millimeter wavelengths.

Further, the HEMT devices of power amplifier 200 may operate in the W-band at approximately 95 GHz. The HEMT devices may comprise Series III and Series V elements, such as, for example, Gallium Nitride (GaN). Further, the power amplifier 200 may comprise a solid-state device operating in a range from 90-100 GHz or any frequency approved by a government with jurisdiction to produce reactive deterrence pain without permanent injury or death. The power amplifier 200 may comprise power transistors such as those described herein. This may result in a solid-state device being operable to produce an FET source output of at least approximately 20 Watts/mm of gate width. Such a production of 10 to 20 or more such devices in a monolithic microwave integrated circuit (MMICs) package or packages is adequate to produce the beam necessary to deter an actor from actions with negative consequences by, for example, directing a beam of ½ to 1 watt per square centimeter for ½ to 1 second at the face of an actor. Such a beam would create a sensation of pain and heat in the skin of actor 102 without causing any permanent damage. Typically, most people experiencing this move immediately to avoid the pain. The hand-held nonlethal weapon 600 would be further capable of creating and forming a beam at other intensities for different durations.

An output conditioning network 125 in FIG. 2*a* between the power amplifier 200 and the beamformer 190 performs the roll of maximizing and preserving high efficiency. The three roles of the output conditioning network are (a) to measure phase differences among the outputs of the HEMT devices in the power amplifier 200, (b) to correct those differences with phase shifters, and (c) to trap spurious harmonics (usually the $1^{st}$ and $3^{rd}$) and feed that energy back to the front end of the power amplifier 200. These output conditioner unit functions all serve to maximize the Power Added Efficiency of the power amplifier 200. The output conditioner unit is comprised of metamaterials to perform these various functions at 95 GHz, 190 GHz and 380 GHz.

Referring again to FIG. 2*a* and to FIG. 2*b*, regarding the reactive deterrence power amplifier 200, the individual amplifier devices are further illustrated in FIG. 2*b* in a cross-sectional view. As illustrated in FIG. 2*b*, each of multiple devices that may be combined in parallel inside a MMICs package comprising power amplifier 200 may comprise at least one InAlGaN High Electron Mobility Transistor (HEMT) 224, also known as an electron supply layer. The InAlGaN HEMT 224 may further comprise a spacer layer 226. As shown in FIG. 2*b*, the spacer layer 226 may be positioned under the InAlGaN HEMT 224. The spacer layer 226 may comprise an AlGaN spacer. The spacer layer 226 may be operable to 100-volt source-to-gate potential and up to approximately 20-watts per millimeter of source-to-gate separation. The spacer layer 226 may be positioned over an electron channel layer 228. The electron channel layer 228 may be positioned above a buffer layer 220. The buffer layer 220 may further be positioned over a diamond substrate 230.

During operation, the hand-held nonlethal weapon 100 may produce heat. The diamond substrate 230 may serve to disperse heat from the power amplifier 200 and the constituent layers to passive heat sinks or active heat exchanger devices, as shown by arrows 232.

The power amplifier 200 may operate at a voltage of approximately 100V. Further, in some embodiments, the power amplifier 200 may operate with approximately 20 W/mm of gate width for each device. Nominal gate width may be approximately one millimeter and output power as high as 22.3 W has been reported for each device.

One or more source oscillators on a metamaterials layer 123 may be in a juxtaposition ahead of the power amplifier layer 200 and consist of split ring resonators with an inductance-capacitance (L-C) equivalence of a tank circuit resonating at a desired frequency, such as 95 GHz. In some embodiments, the metamaterials output conditioner 125, as depicted in the flow chart of FIG. 3, may comprise concentric split-ring resonators to trap spurious harmonics and route that unwanted energy back to the input of the power amplifier 200 to substantially increase power-added efficiency (PAE) of the power amplifier 200. The output conditioner 125 may also comprise phase comparators to measure the relative phases of the parallel power amplifier outputs and phase shifters to synchronize all outputs to maximize coherence and PAE.

Figure 3:
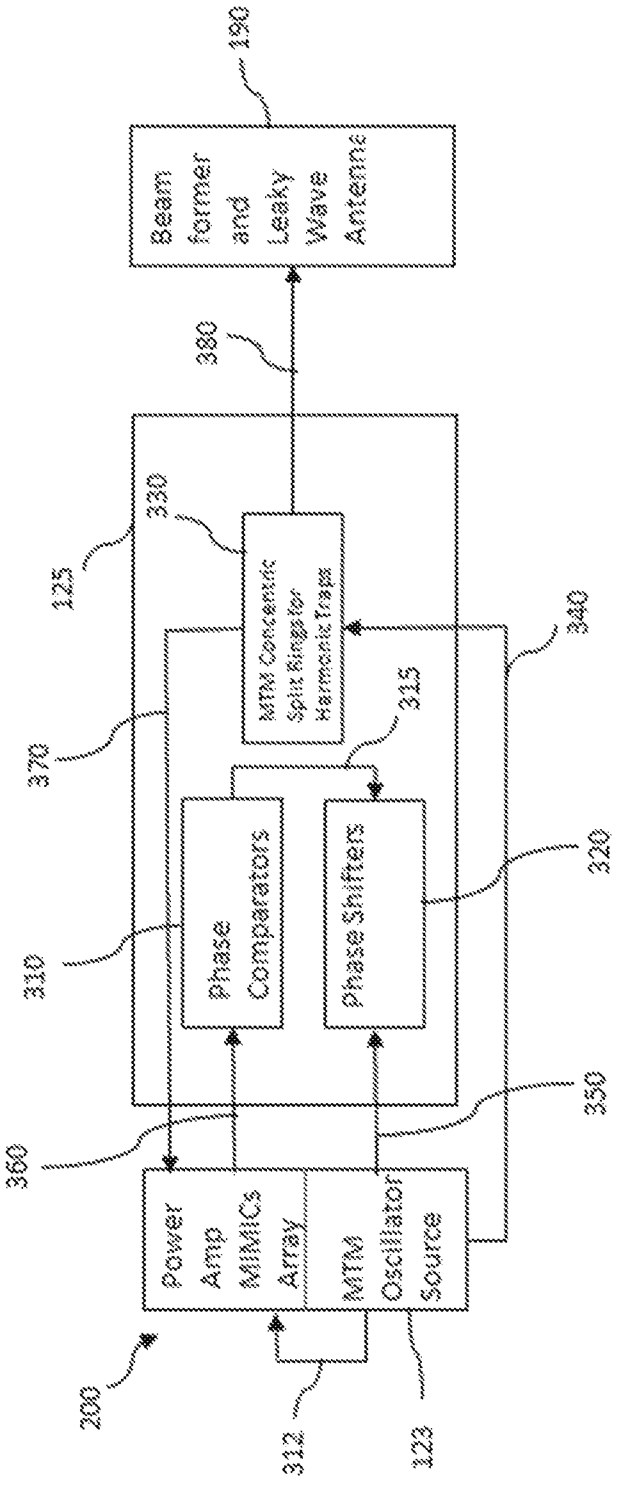
FIG. 3 illustrates an enhanced view of the reactive deterrence solid-state power amplifier devices.

The output conditioner 125 is shown in further detail in in FIG. 3. FIG. 3 illustrates the power amplifier 200 receiving input from a metamaterial oscillator source. The power amplifier 200 may send information regarding the phase of energy output to the phase comparator 310. The phase comparator 310 may measure and compare phases of the output energy in order to send the phases to the phase shifter 320, which may act to synchronize all outputs and maximize coherence and PAE. This may then be sent back to the power amplifier 200 as shown by 350. 340 illustrates the power amplifier 200 output to the metamaterials concentric split rings 330. The metamaterials concentric split rings 330 may act to trap the $1^{st}$ and $3^{rd}$ harmonics and eliminate those. The output may then be sent to the beamformer 190 for direction and shaping towards a target.

The beamformer 190 may be comprised of a metamaterial layer. The layer may be comprised of gold or graphene metal-coatings over vanadium dioxide on a silicon substrate. The metamaterial layer comprising the beamformer 190 may be comprised of any other anisotropic composite materials functioning in a similar manner, as described herein below.

The beamformer 190 may include a guided-wave structure known in the art as a substrate integrated waveguide (SIW). The SIW leaky-wave antenna may consist of four LWA elements (like a wheel with 8 spokes) that conform to the shape of the substrate and are fed by standard WR-28 waveguide. The SIW design is one of several candidates that are attractive due to their low loss, low cost, and ease of integration with metamaterial structures. In certain metamaterials composites combined with leaky-wave antennas, the 95 GHz wave velocity can and must exceed the velocity of light. The result is then leaky wave radiation rather than resonance propagation via an antenna. In this such embodiments, about 90% of the radiation will be released in a focused beam through the barrel 103 and the opening 103*a* and the remaining energy will be absorbed by matched loads at the end of the LSA elements. Further, the beamformer 190 with its LWA elements may be shielded from the exterior environment. The shielding may be operable to prevent the beamformer 190 and LWA from being exposed to environmental elements. The shielding will be described further herein below.

The beamformer 190 may in some embodiments comprise a composite metamaterial that is anisotropic. The beamformer 190 may comprise fishnet-shaped metal grids separated by a dielectric material such that the dimensions of the grid-like structure are less than 1 mm thick and with a grid pattern much smaller than the wavelength of the reactive deterrence beam (i.e., <<3.16 mm). Such a composite metamaterial may have both negative permeability and negative permittivity, and therefore negative refractive index in steering elements of the 95 GHz reactive deterrence beam. By varying the electric field across small sections of the metal grid and the magnetic field in the orthogonal direction across the grid, the angle of the 95 GHz beam can be precisely altered across the face of the beamformer 190 to change the overall beamwidth. The control drivers 110 (as shown in FIG. 1) may control the electric and magnetic fields according to the desired beamwidth that results in a physical beam diameter at the range of the target actor 102 that is 19 centimeters across at any range from 3 to 30 meters or that is more or less than 19 centimeters as selected by the operator.

Referring again to FIG. 5*a*, the beamformer 620 may be operably coupled to a control driver 610 and may be in communication with the control driver 610, which will be explained further herein below. The control driver 610 may be operable to receive inputs from various sources and to provide instruction and direction to the beamformer 620 as to shape as well as size and the intensity of the beam of energy 604 as it radiates outward from the beamformer 620 toward an actor.

The beamformer 620 may be operable to form the beam of energy 604 in a form dictated by the systems of the hand-held nonlethal weapon 600. The beamformer 620 may form the beam of energy 604 such that beam of energy 604 is a focused beam capable of being directed at a specific portion of the body of an actor. The beam of energy 604 may grow in size from its initial diameter of 2.65 cm or less. For example, at a range of between 3 and 30 meters from the opening 603*a*, the beam of energy 604 may have a diameter of approximately 19 cm at all ranges from 3 to 30 meters from the at least one opening. The beam diameter may be manually adjusted as discussed herein below.

In some embodiments, the beamformer 620, which may comprise a leaky wave antenna, may be covered by a hermetic seal or hermetic coating 621 on the barrel opening side of the hand-held nonlethal weapon 600. The hermetic seal 621 may prevent the passage of dust, dirt or moisture from the outside environment to the beamformer 620 and the other layers of the reactive deterrence subsystem. The hermetic seal 621 may comprise a clear epoxy hermetic seal or other type of appropriate hermetic seal, as known in the art.

In some embodiments, the hermetic seal 621 may comprise an outer portion of the beamformer 620 or may be separated from the beamformer 620. For example, in embodiments similar to those shown in FIG. 5*a*, a hermetic seal 621 may be located at adjacent to the beamformer 620. The hermetic seal 621 does not interfere with the propagation of the beam of energy 604.

Further embodiments may include a control driver 610. The control driver 610 may comprise a memory and a processor for storing and processing collected data and information. The control driver 610 may be operable to receive inputs from various sources, as will be described herein below. The control driver 610 may further be in communication with and may be operably coupled to each of the subsystems and components previously described herein and those described herein below. For example, the control driver 610 may be operably coupled to the trigger 601*b*, the beam former 620, the power amplifier 619, and the battery 680, as well as other components described herein below. The control driver 610 may receive inputs from each of these components, process the data input, and send information and data to each of these components. For example, the control driver 610 may be operably coupled to the to the beamformer 620, such that the control driver 610 provides instruction and support to the beamformer 620.

Further embodiments may include a data storage module 614. The data storage module 614 may comprise a solid-state memory device. The data storage 614 may be operable to store inputs from various sources, as will be described herein below. In addition, the data storage 614 may be operable to send data to various components of the hand-held nonlethal weapon 600, such as, for example, the control driver 610. The data may be used by the control driver 610 to create instructions to the beamformer 620.

The control driver 610 may be operable to use the received data to provide instruction to the power amplifier 619 and to the beamformer 620 that the beam of energy 604 is to be generated and formed. The beam of energy 604 may subsequently be released from the barrel opening 603*a*. The user of the hand-held nonlethal weapon 600 acts as the guidance system for the hand-held nonlethal weapon 600, pointing the hand-held nonlethal weapon 600 in the desired direction, presumably toward the actor.

The hand-held nonlethal weapon 600 produces a beam of energy 604 that is nonlethal in nature. The beam of energy may be directed to the actor. The beam of energy may further be directed to a specific region of the body of the actor, such as the face, the chest, the arms, the right or left hand, or other area of the body of the actor. The beam of energy 604 may further cause the actor to experience pain in the region of the body of the actor affected by the beam of energy 604. Upon contact from the beam of energy 604 to the specific region of the body of the actor, the actor may experience pain in the form of extreme heat or other sharp and intense painful sensations. In some embodiments, the hand-held non-lethal weapon 600 may produce and reproduce the beam of energy 604 multiple times per second or multiple times over a period of seconds or minutes, depending upon the responses of the actor. The duration of each pulse of energy may be set manually with a rotary knob 605 or other means to adjust duration, as will be recognized in the art, such as via a digital or electronic adjustment. In further embodiments, the duration of each pulse may be set to a default value or may be automatically determined based on environmental inputs.

The hand-held nonlethal weapon 600 may further comprise knob 605. Knob 605 may be used to manually adjust the pulse duration that any given beam of energy 604 may last. For example, the beam of energy 604 may have a pulse duration of 0.1 seconds to 1.0 seconds. Knob 605 may be coupled to the body 601 or the barrel 603 and may be operably coupled with the control driver 610. Control driver 610 may receive the setting from knob 605 and may then communicate the setting to the beamformer 620 and source 619 to form a beam having the proper duration. The duration may be adjusted using knob 605, or alternatively, in further embodiments may be adjusted using a digital interface. In yet further embodiments, the control driver 610 may adjust this setting automatically based on pre-programmed inputs. For example, the control driver 610 may be programmed to reduce the pulse duration after multiple beams of energy 604 are released at maximum duration.

Given the pulse duration setting of knob 605, (T in seconds) of knob 605 and the area of the beam at the target as set by the beam diameter (D in centimeters) of knob 605, the power output (P in watts) of the total beam of energy 604 may be adjusted automatically by the control driver 610 so that the total energy per square centimeter in Joules (J) deposited at the target never exceeds the maximum specified by the U.S. government as the maximum safe level. A past safe limit specified by the government for human skin was 1 Joule per 1 square centimeter within a 1-second period. The maximum duration of the beam's pulse is therefore given by the formula, T=(D^2)/(0.785P), or maximum power per square centimeter at the target is P=(D^2)/(0.785 T).

In all embodiments, the hand-held nonlethal weapon 600 may only deliver energy intensities and pulse durations that are determined to be well-below levels and durations that clinical trials have determined to be safe and free from any permanent injury. The beam of energy 604 may be directed to and targeted to different regions of the body of the actor. The pain caused in the actor by the beam of energy 604 may cause the actor to cease whatever threat or action the actor is participating in. Further, it may cause the actor to retreat to a desired area. Further, the hand-held nonlethal weapon 600 may continue to produce the beam of energy 604 in order to maintain the retreated position of the actor. The continued production of pulses of the beam of energy 604 may be prompted by the user depressing the trigger 601*b*. In further embodiments, the hand-held nonlethal weapon 600 may be programmed to cease producing the beam of energy 604 after a certain number of pulses fired within a specified time period.

In further embodiments, the hand-held nonlethal weapon 600 may comprise an adjustment knob 607. The adjustment knob 607 may be coupled to the body 601. The adjustment knob 607 may be operable to manually adjust the diameter of the beam of energy 604. The adjustment knob 607 may be operably coupled to the control driver 610 and to the data storage module 614. Any inputs from the adjustment knob 607 may be received and processed at the control driver 610, stored in the data storage module 614, and instruction may then be given to the beamformer/leaky wave antenna 620 regarding the diameter of the beam of energy at the target, the target being a specified distance from the hand-held nonlethal weapon 600.

In further embodiments, the hand-held nonlethal weapon 600 may have an automatic mode. The fully automatic mode may be activated by a user of the hand-held nonlethal weapon 600 by depressing and holding down trigger 601*b*. In the fully automatic mode, the beam 604 could be repeatedly released with a time interval between shots being set by a manual switch or permitted to fire at a maximum rate limited only by the time to re-charge the power supply 670.

The advantages of a fully-automatic mode would be evident when there are multiple bad actors. The re-charge delay might be sufficient to re-aim from target to target. If too rapid, the manual setting could slow the sequence.

In further embodiments, the hand-held nonlethal weapon 600 may comprise a "Ready Light" visible from the shooter's sighting of the weapon on the target. Such a feature may be applicable to both semi-automatic as well as in fully automatic embodiments.

Safety risks in fully automatic mode of the hand-held nonlethal weapon 600 are different than for a traditional fully-automatic firearm. For example, a fully-automatic firearm carries an inherent difficulty that the hand-held nonlethal weapon 600 does not experience—a "kick" or a "recoil" that takes the weapon off-target. While that effect is not present in the case of the hand-held nonlethal weapon 600, there is a time-delay in re-aiming from target-to-target that varies among users. This re-aiming necessity could increase the probability of striking a false target; however, the beam 604 is a nonlethal beam, and any false target exposure would represent only temporary pain and no permanent injury to a false target.

In further embodiments, the hand-held nonlethal weapon 600 may comprise a laser range finder 640. The laser range finder 640 may be coupled to the body 601. The laser range finder 640 may be operable to send a laser 642*a* toward a target, such as an actor, and may further be operable to receive a laser 642*b*. Similar to other laser range finders known in the art, the laser range finder 640 may further include a computing device operable to compute the distance to the target based on the time required for laser 642*b* to return to the laser range finder 640, as is known in the art. The laser range finder 640 may be operably coupled to the data storage 614 and may pass the data containing the distance to the target to the data storage 614. The data storage 614 may communicate the distance data to the control driver 610. The control driver 610 may utilize the distance data to provide instruction to the power amplifier 200 and the beamformer 620 to create the beam of energy 604 such that beam of energy 604 has the appropriate strength for the range and adjusted size at the target's range such that the beam is 19 cm in diameter or whatever size is selected when programming the weapon's computer 610. The laser may be visible and may be operable to aid a user in aiming the hand-held nonlethal weapon 600.

The primary aiming procedure uses a laser range finder 640 that is activated when the user pulls the trigger 601*b* half-way back producing the outgoing laser beam 642*a*. To aim the hand-held nonlethal weapon 600 precisely, the user must observe the laser beam 642*a* at a target such as an actor and move the weapon such that the beam 642*b* reflected by the target is from a central location high on the target's chest near the base of the neck. Aiming the weapon 600 using the barrel 603 is only a preliminary step. Therefore, in further embodiments, the barrel 603 may be shortened or removed entirely. The power amplifier 619, beamformer 620, and hermetic coating 624 of the reactive deterrence subsystem are less than one centimeter thick and in further embodiments may be flush-mounted in or on a hand-held vertical surface in which the other components such as the trigger switch 601*b*, laser rangefinder 640, battery 680, power supply 670, data storage 614, and control drivers 610 would all be located elsewhere in the alternative packaging.

In further embodiments, the hand-held nonlethal weapon 600 may comprise a laser switch 643. The laser switch 643 may be operable to manually activate the laser ranger finder 640. The laser switch 643 may be operably coupled with the laser ranger finder 640, operable to activate the laser range finder 640 upon engaging the laser switch 643, and operable to deactivate the laser range finder 640 upon disengaging the laser switch 643. The hand-held nonlethal weapon 600 may comprise a gyroscope or a gyrosensor to determine if there has been movement. The gyroscope or the gyrosensor may be coupled to the control driver 610 and may process data received from the gyroscope or the gyrosensor and determine if the laser range finder should be actuated and subsequently send a signal to activate the laser range finder 640.

In further embodiments, the laser range finder 640 may be automatically engaged any time the hand-held nonlethal weapon is settled upon a target for a fixed period of time. That period of time may be, for example, a short period of time, such as, for example, less than 0.25 seconds, or less than 0.5 seconds. The hand-held nonlethal weapon 600 may comprise a gyroscope or a gyrosensor to determine if there has been weapon movement. The gyroscope or the gyrosensor may be coupled to the control driver 610 and may process data received from the gyroscope or the gyrosensor and determine if the laser range finder should be actuated and subsequently send a signal to activate the laser range finder 640.

Further embodiments may include an acoustic sensor 650. Acoustic sensor 650 may be operable to record the audio signals that may occur during encounters while using the hand-held nonlethal weapon 600. The acoustic sensor 650 may be activated upon engaging the power-on safety switch 601*c*. In alternative embodiments, the acoustic sensor 650 may be activated by a timer, a gyroscope, or by manual means by a user. The acoustic sensor 650 may be operably coupled with and in communication with the data storage 614. The data storage 614 is operable to store the audio data captured by the acoustic sensor 650. Further, acoustic sensor 650 may be operably coupled or mounted on barrel 603 or body 601.

In some embodiments, the acoustic sensor 650 may be operably connected to the data storage 614. The data storage 614 may be operable to record the data containing the audible noises in the area around the hand-held nonlethal weapon 600. These noises may include, for example, words by the actor and the user(s) of the hand-held nonlethal weapon 600 for the purpose of legal documentation of the event, training purposes, etc.

In additional embodiments, the hand-held nonlethal weapon 600 may include an optical sensor 660. Optical sensor 660 may be operable to record the optical signals that may occur during encounters while using the hand-held nonlethal weapon 600, such as the scene unfolding in front of and around a user. The optical sensor 660 may be activated upon engaging the power-on safety switch 601*c*. In alternative embodiments, the optical sensor 660 may be activated by a timer, a gyroscope or gyrosensor detecting weapon movement, or by manual means by a user. Further, the optical sensor a 660 may be activated by a motion sensor within the optical sensor 660 and may be operably coupled with and in communication with the data storage 614. The data storage 614 is operable to store the audio data and optical sensor 660 data. Further, optical sensor 660 may be operably coupled or mounted on barrel 603 or body 601.

In certain embodiments, the acoustic sensor 650 and the optical sensor 660 may be operable to record video and still images and audio to document events preceding, during and after the hand-held nonlethal weapon is drawn, pointed at one or more actors, and fired for legal documentation and training purposes.

Figure 5B:
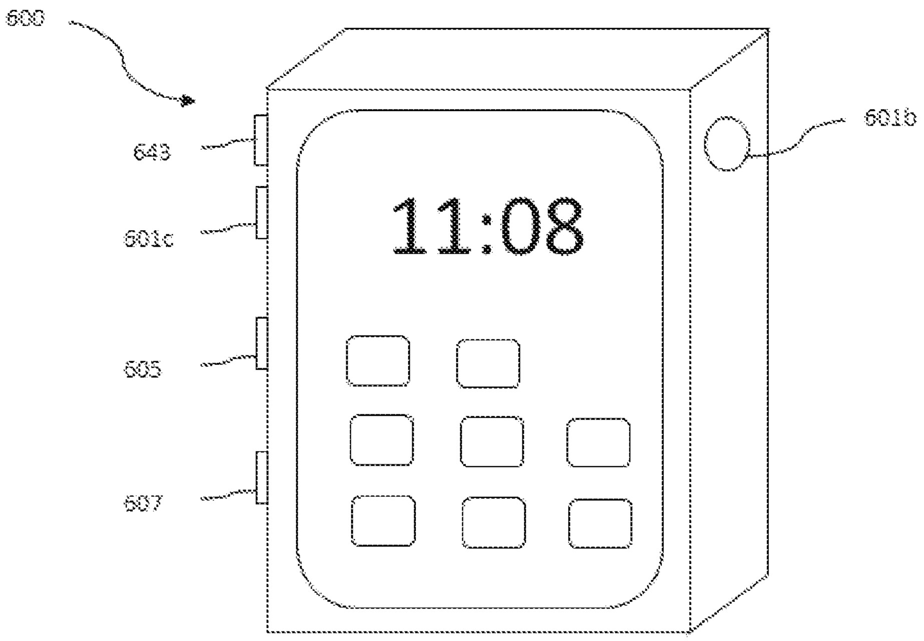

The hand-held nonlethal weapon 600 may be operable to couple with a mobile electronic device 685, as illustrated in FIG. 5*b*. The mobile electronic device 685 may comprise a cellular phone, a smart phone, a tablet, or other mobile electronic device. The hand-held nonlethal weapon 600 may couple to a mobile electronic device in a manner similar to a case for a smart phone. The hand-held nonlethal weapon 600 may be operable to couple with any of the power input port, the audio port, and/or the data exchange port of the mobile electronic device 685.

In some embodiments, the hand-held nonlethal weapon 600 may be controlled via controls as described herein above. In further embodiments, the mobile electronic device 685 may alternatively also comprise means for controlling the hand-held nonlethal weapon 600, such as, for example via an application ("an app") found on the mobile electronic device 685. In further embodiments, the manual controls described herein may be eliminated and the controls may be entirely located within the app of the mobile electronic device. The hand-held nonlethal weapon 600 may exchange commands and information and data via the data exchange port of the mobile electronic device 685 or via a wireless connection. In the case of a wireless connection, the hand-held nonlethal weapon 600 may be equipped with a wireless transceiver. The mobile electronic device 685 may be equipped with computing capability to compute distances to target etc. and share that information with the hand-held nonlethal weapon 600.

In further embodiments, the hand-held nonlethal weapon 600 may further be operable to communicate with the mobile electronic devices 685. The hand-held nonlethal weapon 600 may communicate with the mobile electronic devices 685 via a wired or a wireless link. The hand-held-nonlethal weapon may comprise the hardware necessary to complete a wireless link with an external device and may further comprise a plug required to mate with a data exchange port of the mobile electronic device. The wireless link may be facilitated by any suitable technology, such as for example Bluetooth, infrared wireless, ultrawideband, induction wireless, near field communication, and so on.

Such a wired or wireless link may facilitate communication from the hand-held nonlethal weapon 600 to a mobile electronic device. The hand-held nonlethal weapon may transmit recorded video data, audio data, and data regarding the use of the hand-held nonlethal weapon 600, such as, for example the number of times a trigger has been pulled, the location of an actor, the performance of the hand-held nonlethal weapon 600 and other data gathered from the hand-held nonlethal weapon 600.

Further, the hand-held nonlethal weapon 600 may receive data from a mobile electronic device, such as for example, software downloads to fix bugs, change performance parameters to be in line with updated federal, state, and local laws where the user of the hand-held nonlethal weapon 400 resides or where the user may have traveled if the associated mobile electronic device is enabled by the user to provide current location. The mobile electronic device may be equipped with an application (an "app") operable to communicate with a central server, the central server operable to receive and send data from the hand-held nonlethal weapon 600 via connection through the mobile electronic device. In further embodiments, the hand-held nonlethal weapon 600 may be operable to communicate directly with a central server, both sending and receiving data, via means known in the art.

The central server, may in some scenarios, send instruction to the hand-held nonlethal weapon 600 that would disable the reactive deterrence capability of the hand-held nonlethal weapon 600. This may occur in scenarios where the hand-held nonlethal weapon 600 is being misused. Misuse may include a violation of terms of use agreed to by the user at the time of acquiring the hand-held nonlethal weapon 600.

In further embodiments the hand-held nonlethal weapon 600 may be kept in a holster when not in use. The hand-held nonlethal weapon 600 and associated systems, such as the acoustic sensor 650, the optical sensor 660, the laser range finder 640, and so forth, may be automatically activated. Such activation may take place upon withdrawing the hand-held nonlethal weapon 600 from the holster. The activation of the hand-held nonlethal weapon 600 and other features thereof may be actuated by removing the weapon from the holster. In further embodiments, the hand-held nonlethal weapon 400 may be kept in a holster and automatically deactivated when not in use. The hand-held nonlethal weapon 100 and associated systems, such as the optical sensor 660, the acoustic sensor 650, the laser range finder 640, and so on, may be automatically activated. Such activation may take place upon withdrawing the hand-held nonlethal weapon 600 from the holster. The activation of the hand-held nonlethal weapon 600 and other features thereof may be actuated by a mechanical or magnetically actuator switch on the body 600 that is set to OFF when the weapon is fully inserted in the holster and set to ON when it is withdrawn from the holster. The actuator switch may be operably coupled to the control driver 610 and may be actuated upon being withdrawn from the holster.

In further embodiments, the hand-held nonlethal weapon 600 may further be operable to be operated in a "practice" mode wherein the reactive deterrence function is deactivated, and a user may utilize the hand-held nonlethal weapon 600 for practice purpose only. The user may switch to practice mode (or vice-versa to active mode) by flipping switch 655. Switch 655 may be coupled to the control driver 610. Switch 655 may send a signal to control driver 610. Upon receiving a signal from the switch 655, the control driver 610, which may also be operably coupled to each component of the hand-held nonlethal weapon 600, including the power amplifier 619 and the beamformer 620, may shut off the power amplifier 619 and/or to the beamformer 620, thereby disabling the reactive deterrence capability of the hand-held nonlethal weapon 600 and allowing a user to utilize the hand-held nonlethal weapon in practice mode.

In further embodiments, the laser site may also be activated while in active mode to either assist a user in aiming the hand-held nonlethal weapon 600 while in use and to provide feedback data to the user and to the hand-held nonlethal weapon 600, specifically to the control driver 610, which may be communicated to a mobile electronic device 685, and subsequently to a central server, or in other embodiments, such data may be transferred directly to the central server.

Figure 6A:
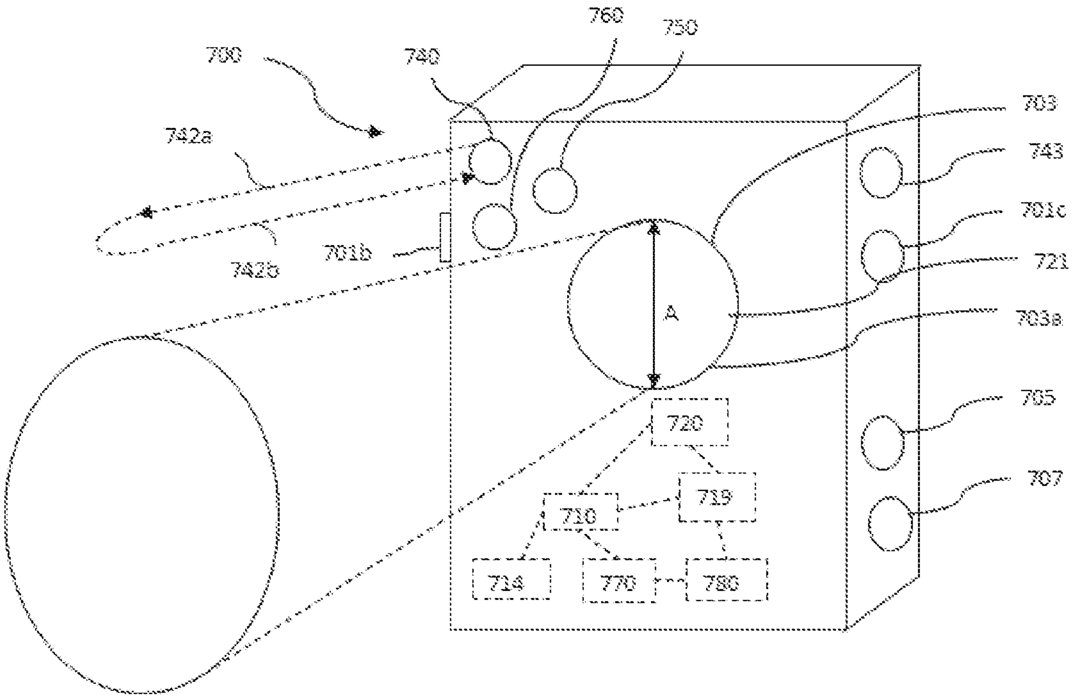
FIGS. 6*a* and 6*b* illustrate another embodiment of the hand-held nonlethal weapon.
Figure 6B:
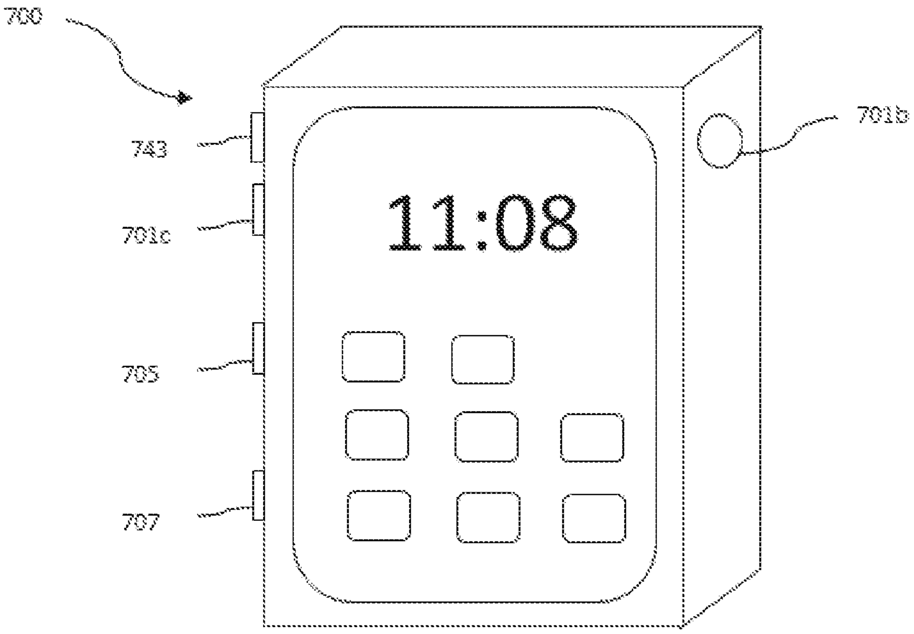

FIGS. 6*a* and 6*b* illustrate further embodiments of the present invention. FIG. 6*a* illustrates a mobile electronic device 700 from a rear-facing view. The mobile electronic device 700 may comprise a cellular phone, a smart phone, a tablet, or other similar mobile electronic device. The mobile electronic device 700 may comprise elements known in the art, including the ability to make and receive phone calls via a cellular network or via a wi-fi or mobile network, a microphone, speakers, a camera operable to record video and still images, the ability to upload and download data via a wi-fi or mobile network, a processor and memory to facilitate these functions, a user interface, including a screen and/or a keyboard, and so on.

The mobile electronic device 700 may comprise a hand-held nonlethal weapon 700*a*. The hand-held nonlethal weapon may comprise elements similar to other embodiments described herein above. Specifically, the hand-held nonlethal weapon 700*a* may be operable to deter an actor. The actor or actors may pose some type of threat to a population or to an individual, such as a violent threat.

The hand-held nonlethal weapon 700*a* may comprise several subsystems that act in cooperation to deter an actor and to document the encounter. The hand-held nonlethal weapon 700*a* may comprise a body 701. The body 701 may be shared with the body of the mobile electronic device 700. The body 701 may comprise a body 701*a* and a trigger switch 701*b* operably coupled to the body 701. The trigger switch 701*b* may be operable to be engaged by a user. The trigger switch 101*b* may initiate the creation of a reactive deterrence beam, as discussed herein below.

In some embodiments, body 701 may further comprise a power-on safety switch 701*c*. The power-on safety switch 701*c* may be separate from the power switch for powering on the mobile electronic device 700. The power-on safety switch 701*c* may be operable to activate the various subsystems described herein below upon being engaged. The power-on safety switch 701*c* may be operably connected to each of the subsystems described herein below, such that each of the subsystems may become operable upon engaging the power-on safety switch 701*c* or may become operable upon engaging the power-on safety switch 701*c*. This may happen in combination with an additional activation protocol, such as withdrawal of the mobile electronic device 700 from a holstered standby condition, as will be discussed herein. The power-on safety switch 701*c* may be engaged by the hand of a user gripping the body 701 and the safety switch 701*c* may be mounted on the front or rear side of the handle 701.

The hand-held nonlethal weapon may further comprise a barrel 703 operably coupled to the body 701. The barrel 703 may be a short barrel, having a length equal to that of the body 701. Further the barrel 703 may not extend past the body 701, with the end of the barrel 703 being flush with the body 701. In some embodiments, the barrel 703 may be considered to be merely an opening in the body 701 to facilitate the use of the hand-held nonlethal weapon 600.

Further, the barrel 703 may comprise opening 703*a*. In some embodiments, the barrel opening 703*a* may have an inner diameter "A" of 2.65 centimeters (cm). In further embodiments, the barrel opening 703*a* inner diameter may be smaller than 2.65 cm, such as for example, between 1 cm and 2.65 cm. In further embodiments, the barrel opening inner diameter may be larger, such as, for example, 2.65 cm to 4.0 cm.

The hand-held nonlethal weapon 700*a* of FIGS. 6*a* and 6*b* may further comprise a battery 780. The battery 780 may be located within the body 701 and may be operably coupled to the trigger 701*b*. In some embodiments the battery 180 may be a rechargeable battery. The battery 780 may be a nickel-metal hydride battery, or other suitable rechargeable battery. The battery 780 may be operably coupled to and may be operable to provide power to all subsystems and components of the hand-held nonlethal weapon 700 that require power to operate. The battery 780 may be positioned within the body 701 and may be operably coupled to the body 701 such that the hand-held nonlethal weapon 700 may be moved and carried in a manner similar to other personal or service weapons.

In further embodiments, the hand-held nonlethal weapon 700 may comprise a power supply 770. The power supply 770 may be coupled to the body 701 and may be operably coupled to the battery 780. The battery 780 may be operable to provide power to the power supply 770. The power supply 770 may be operably coupled to and may be operable to provide various voltages at various levels to all electronic subsystems and components of the hand-held nonlethal weapon 700 that require power to operate.

The hand-held nonlethal weapon 700 may further comprise a power amplifier 719. The power amplifier 719 may be operably coupled to the power supply 770, which may be operable to supply power to the power amplifier 719. The power amplifier 719 may be operable to create a nonlethal beam, such as beam 704, as discussed herein below.

The hand-held nonlethal weapon 700*a* of FIG. 6 may further comprise a beamformer 720. The beamformer 720 may be coupled to the body 701 of the hand-held nonlethal weapon 700*a*. The beamformer 720 may be operable to form, with the power amplifier 719, a reactive deterrence beam 704, which may be projected from the hand-held nonlethal weapon 700*a*. In some embodiments, the reactive deterrence beam 704 may be projected in the direction of actor 702 and the reactive deterrence beam 704 may contact actor 702 in the face, hands, arms, chest, or other portion of the body of actor 702. The beamformer 720 may comprise metamaterial devices or layers, as will be described herein below.

FIG. 2*a* illustrates in further detail a beamformer, a power amplifier, and related components. FIG. 2*a* illustrates a beamformer 190. Beamformer 190 may be represent any beamformer discussed herein, such as, beamformer 720, shown and described in FIG. 6. As related to other embodiments, beamformer 190 may represent other beamformers found in other embodiments. Power amplifier 200 may represent any power amplifier as described herein, such as power amplifier 719 as shown and described in FIG. 6.

Furthermore, power amplifier 719 and beamformer 720 act to produce beam 704. Beam 704 is similar to other beams as described herein. The function and production of the beam 704, therefore, has been discussed herein with regard to other embodiments. The same principles described previously regarding the production of beams of energy and the function and operation of the power amplifier and beamformer apply to the beam of energy 704, power amplifier 719, and beamformer 720 and therefore will not be described in detail.

In some embodiments, the beamformer beamformer 720, which may comprise a leaky wave antenna, may be covered by a hermetic seal or hermetic coating 721 on the barrel opening side of the hand-held nonlethal weapon 700. The hermetic seal 721 may prevent the passage of dust, dirt or moisture from the outside environment to the beamformer 720 and the other layers of the reactive deterrence subsystem. The hermetic seal 721 may comprise a clear epoxy hermetic seal or other type of appropriate hermetic seal, as known in the art. The hermetic seal 721 does not interfere with the propagation of the beam of energy 704.

Further embodiments may include a control driver 710. The control driver 710 may comprise a memory and a processor for storing and processing collected data and information. The control driver 710 may be operable to receive inputs from various sources, as will be described herein below. The control driver 710 may further be in communication with and may be operably coupled each of the subsystems and components previously described herein and those described herein below. For example, the control driver 710 may be operably coupled to the trigger 701*b*, the beam former 720, the power amplifier 719, and the battery 780, as well as other components described herein below. The control driver 710 may receive input from each of these components, process the data input, and send information and data to each of these components. For example, the control driver 710 may be operably coupled to the to the beamformer 720 and the power amplifier 719, such that the control driver 710 provides instruction and support to the beamformer 720. In certain embodiments, the control driver 710 may be dedicated to the hand-held nonlethal weapon 700*a*. In further embodiments, the control driver 710 may be shared with the computing system and processor of the of the electronic mobile device 700.

Further embodiments of mobile electronic device 700 may include a data storage module 714. The data storage module 714 may comprise a solid-state memory device. The data storage 714 may be operable to store inputs from various sources, as will be described herein below. In addition, the data storage 714 may be operable to send data to various components of the hand-held nonlethal weapon 700*a*, such as, for example, the control driver 710. The data may be used by the control driver 710 to create instructions to the beamformer 720. In certain embodiments, the data storage module 714 may be dedicated to the hand-held nonlethal weapon 700*a*. In further embodiments, the data storage module 714 may be shared with the data storage system of the of the electronic mobile device 700.

The control driver 710 may be operable to use the received data to provide instruction to the power amplifier 719 and to the beamformer 720 that the beam of energy 704 is to be generated and formed. The beam of energy 704 may subsequently be released from the opening 703*a*. The user of the hand-held nonlethal weapon 700*a* acts as the guidance system for the hand-held nonlethal weapon 700*a*, pointing the hand-held nonlethal weapon 700*a* in the desired direction, presumably toward the actor.

The hand-held nonlethal weapon 700*a* may produce a beam of energy 704 that is nonlethal in nature. The beam of energy may be directed to the actor. The beam of energy may further be directed to a specific region of the body of the actor, such as the face, the chest, the arms, the right or left hand, or other area of the body of the actor. The beam of energy 704 may further cause the actor to experience pain in the region of the body of the actor affected by the beam of energy 704. Upon contact from the beam of energy 704 to the specific region of the body of the actor, the actor may experience pain in the form of extreme heat or other sharp and intense painful sensations. In some embodiments, the hand-held non-lethal weapon 700*a* may produce and reproduce the beam of energy 704 multiple times per second or multiple times over a period of seconds or minutes, depending upon the responses of the actor. The duration of each pulse of energy may be set manually with a rotary knob 705 or other means to adjust duration, as will be recognized in the art, such as via a digital or electronic adjustment. In further embodiments, the duration of each pulse may be set to a default value or may be automatically determined based on environmental inputs.

The hand-held nonlethal weapon 700 may further comprise knob 705. Knob 705 may be used to manually adjust the pulse duration that any given beam of energy 704 may last. For example, the beam of energy 704 may have a pulse duration of 0.1 second to 1 second. Knob 705 may be coupled to the body 701 and may be operably coupled with the control driver 710. Control driver 710 may receive the setting from knob 705 and may then communicate the setting to the beamformer 720 and source 719 to form a beam having the proper duration. The duration may be adjusted using knob 705, or alternatively, in further embodiments may be adjusted using a digital interface. In yet further embodiments, the control driver 710 may adjust this setting automatically based on pre-programmed inputs. For example, the control driver 710 may be programmed to reduce the pulse duration after multiple beams of energy 704 are released at maximum duration.

Given the pulse duration setting (T in seconds) of knob 705 and the area of the beam at the target as set by the beam diameter (D in centimeters) of knob 705, the power output (P in watts) of the total beam of energy 104 may be adjusted automatically by the control driver 710 so that the total energy per square centimeter in Joules (J) deposited at the target never exceeds the maximum specified by the U.S. government as the maximum safe level. A past safe limit specified by the government for human skin was 1 Joule per 1 square centimeter within a 1-second period. The maximum duration of the beam's pulse is therefore given by the formula, T=(D^2)/(0.785P), or maximum power per square centimeter at the target is P=(D^2)/(0.785 T). Alternatively, the power output of the beam of energy 704 may be adjusted automatically by the control driver 710. The control driver 710 may receive data from the knob 705 setting, the laser range finder 740, the beam diameter switch 755 setting, and other components of the hand-held nonlethal weapon 700*a* and adjust the power output based on the feedback.

In all embodiments, the hand-held nonlethal weapon 700*a* can only deliver energy intensities and pulse durations that are determined to be well-below levels and durations that clinical trials have determined to be safe and free from any permanent injury. The beam of energy 704 may be directed to and targeted to different regions of the body of the actor. The pain caused in the actor by the beam of energy 704 may cause the actor to cease whatever threat or action the actor is participating in. Further, it may cause the actor to retreat to a desired area. Further, the hand-held nonlethal weapon 700*a* may continue to produce the beam of energy 704 in order to maintain the retreated position of the actor. The continued production of pulses of the beam of energy 704 may be prompted by the user depressing the trigger switch 701*b*. In further embodiments, the hand-held nonlethal weapon 700*a* may be programmed to cease producing the beam of energy 704 after a certain number of pulses fired within a specified time period.

In further embodiments, the hand-held nonlethal weapon 700 may comprise an adjustment knob 707. The adjustment knob 707 may be coupled to the body 701. The adjustment knob 707 may be operable to manually adjust the diameter of the beam of energy 704. The adjustment knob 707 may be operably coupled to the control driver 710 and to the data storage module 714. Any inputs from the adjustment knob 707 may be received and processed at the control driver 710, stored in the data storage module 714, and instruction may then be given to the beamformer 720, which may comprise a leaky wave antenna, regarding the diameter of the beam of energy at the target, the target being a specified distance from the hand-held nonlethal weapon 100.

In further embodiments, the hand-held nonlethal weapon 700*a* may have an automatic mode. The fully automatic mode may be activated by a user of the hand-held nonlethal weapon 700*a* by depressing and holding down trigger 701*b*. In the fully automatic mode, the beam 704 could be repeatedly released with a time interval between shots being set by a manual switch or permitted to fire at a maximum rate limited only by the time to re-charge the power supply 770.

The advantages of a fully-automatic mode would be evident when there are multiple bad actors. The re-charge delay might be sufficient to re-aim from target to target. If too rapid, the manual setting could slow the sequence.

In further embodiments, the hand-held nonlethal weapon 700*a* may comprise a "Ready Light" visible from the user's sighting of the weapon on the target. Such a feature may be applicable to both semi-automatic as well as in fully automatic embodiments.

Safety risks in fully automatic mode of the hand-held nonlethal weapon 700*a* are different than for a traditional fully-automatic firearm. For example, a fully-automatic firearm carries an inherent difficulty that the hand-held nonlethal weapon 700*a* does not experience—a "kick" or a "recoil" that takes the weapon off-target. While that effect is not present in the case of the hand-held nonlethal weapon 700*a*, there is a time-delay in re-aiming from target-to-target that varies among users. This re-aiming necessity could increase the probability of striking a false target; however, the beam 704 is a nonlethal beam, and any false target exposure would represent only temporary pain and no permanent injury to a false target.

In further embodiments, the hand-held nonlethal weapon 700*a* may comprise a laser range finder 740. The laser range finder 740 may be coupled to the body 701. The laser range finder 740 may be operable to send a laser 742*a* toward a target, such as an actor, and may further be operable to receive a laser 742*b*. Similar to other laser range finders known in the art, the laser range finder 740 may further include a computing device operable to compute the distance to the target based on the time required for laser 742*b* to return to the laser range finder 740, as is known in the art. The laser range finder 740 may be operably coupled to the data storage 714 and may pass the data containing the distance to the target to the data storage 714. The data storage 714 may communicate the distance data to the control driver 710. The control driver 710 may utilize the distance data to provide instruction to the power amplifier 200 and the beamformer 720 to create the beam of energy 704 such that beam of energy 704 has the appropriate strength for the range and adjusted size at the target's range such that the beam is 19 cm in diameter or whatever size is selected when programming the weapon's computer 710. The laser 142*a* may be visible and may be used by a user to air the hand-held nonlethal weapon at a target or an actor.

In further embodiments, the hand-held nonlethal weapon 700*a* may comprise a laser switch 743. The laser switch 743 may be operably coupled to the laser range finder 740 and may be operable to manually activate the laser ranger finder 740. The laser switch 743 may be operably coupled with the laser ranger finder 740, operable to activate the laser range finder 740 upon engaging the laser switch 743, and operable to deactivate the laser range finder 740 upon disengaging the laser switch 743. The laser switch 743 may further be operably coupled to the control drive 710 and may send data to the control driver 710 regarding eth on or off status of the laser range finder 740 and the laser switch 743. In further embodiments, the laser switch 743 may be a digital switch.

In further embodiments, the laser range finder 740 may be automatically engaged any time the hand-held nonlethal weapon 700*a* is settled upon a target for a fixed period of time. That period of time may be, for example, a short period of time, such as, for example, less than 0.25 seconds, or less than 0.5 seconds. The hand-held nonlethal weapon 700*a* may comprise a gyroscope or a gyrosensor to determine if there has been weapon movement. The gyroscope or the gyrosensor may be coupled to the control driver 710 and may process data received from the gyroscope or the gyrosensor and determine if the laser range finder should be actuated and subsequently send a signal to activate the laser range finder 740.

Further embodiments may include an acoustic sensor 750. Acoustic sensor 750 may be operable to record the audio signals that may occur during encounters while using the hand-held nonlethal weapon 700*a*. The acoustic sensor 750 may be activated upon engaging the power-on safety switch 701*c*. In alternative embodiments, the acoustic sensor 750 may be activated by a timer, a gyroscope, or by manual means by a user. The acoustic sensor 750 may be operably coupled with and in communication with the data storage 714. The data storage 714 is operable to store the audio data captured by the acoustic sensor 750. Further, acoustic sensor 750 may be operably coupled or mounted on barrel 703 or body 701. In certain embodiments, the acoustic sensor 750 may be a sensor dedicated to the hand-held nonlethal weapon 700*a*. In further embodiments, the acoustic sensor 750 may be shared with the microphone of the of the electronic mobile device 700.

In some embodiments, the acoustic sensor 750 may be operably connected to the data storage 714. The data storage 714 may be operable to capture the data containing the audible noises in the area around the hand-held nonlethal weapon 700*a*. These noises may include, for example, words by the actor and the user(s) of the hand-held nonlethal weapon 700*a* for the purpose of legal documentation of the event, training purposes, etc. In certain embodiments, the data storage 714 may be a sensor dedicated to the hand-held nonlethal weapon 700*a*. In further embodiments, the data storage 714 may be shared with the data storage of the of the electronic mobile device 700.

In additional embodiments, the hand-held nonlethal weapon 700 may include an optical sensor 760. Optical sensor 760 may be operable to record the optical signals that may occur during encounters while using the hand-held nonlethal weapon 700*a*, such as the scene unfolding in front of and around a user. The optical sensor 760 may be activated upon engaging the power-on safety switch 701*c*. In alternative embodiments, the optical sensor 760 may be activated by a timer, a gyroscope or gyrosensor detecting weapon movement, or by manual means by a user. Further, in some embodiments, the optical sensor 760 may comprise a motion sensor. Upon sensing motion, motion sensor may activate the optical sensor. The optical sensor 760 may be operably coupled with and in communication with the data storage 714. The data storage 714 may be operable to store the audio data from audio sensor 750 and the optical data from the optical sensor 760. Further, optical sensor 760 may be operably coupled or mounted on the body 701.

In certain embodiments, the acoustic sensor 750 and the optical sensor 760 may be operable to record video and still images and audio to document events occurring before, during and after the hand-held nonlethal weapon is drawn, pointed at one or more actors, and fired for legal documentation and training purposes. In certain embodiments, the optical sensor 750 may be a sensor dedicated to the hand-held nonlethal weapon 700*a*. In further embodiments, the optical sensor 750 may be shared with the optical sensor of the of the electronic mobile device 700.

In some embodiments, the hand-held nonlethal weapon 700*a* may be controlled via controls as described herein above. In further embodiments, the mobile electronic device 700 may alternatively also comprise means for controlling the hand-held nonlethal weapon 700*a*, such as, for example via an application ("an app") found on the mobile electronic device 700. In further embodiments, the manual controls described herein may be eliminated and the controls may be entirely located within the app of the mobile electronic device. The hand-held nonlethal weapon 700*a* may exchange commands and information and data with the mobile electronic device 700.

The hand-held nonlethal weapon 700*a* may transmit recorded video data, audio data, and data regarding the use of the hand-held nonlethal weapon 700*a*, such as, for example the number of times a trigger has been pulled, the location of an actor, the performance of the hand-held nonlethal weapon 700*a* and other data gathered from the hand-held nonlethal weapon 700*a*.

Further, the hand-held nonlethal weapon 700*a* may receive data from the mobile electronic device 700, such as for example, software downloads to fix bugs, change performance parameters to be in line with updated federal, state, and local laws where the user of the hand-held nonlethal weapon 700*a* resides or where the user may have traveled if mobile electronic device 700 is enabled by the user to provide current location. The mobile electronic device 700 may be equipped with an application (an "app") operable to communicate with a central server, the central server operable to receive and send data from the hand-held nonlethal weapon 700*a* via connection through the mobile electronic device 700. In further embodiments, the hand-held nonlethal weapon 600 may be operable to communicate directly with a central server, both sending and receiving data, via means known in the art.

The central server, may in some scenarios, send instruction to the hand-held nonlethal weapon 700*a* that would disable the reactive deterrence capability of the hand-held nonlethal weapon 700*a*. This may occur in scenarios where the hand-held nonlethal weapon 700*a* is being misused. Misuse may include a violation of terms of use agreed to by the user at the time of acquiring the hand-held nonlethal weapon 700*a*.

In further embodiments the hand-held nonlethal weapon 700 may be kept in a holster when not in use. The hand-held nonlethal weapon 700 and associated systems, such as the acoustic sensor 750, the optical sensor 760, the laser range finder 740, and so forth, may be automatically activated. Such activation may take place upon withdrawing the hand-held nonlethal weapon 700 from the holster. The activation of the hand-held nonlethal weapon 700 and other features thereof may be actuated by removing the weapon from the holster. In further embodiments, the hand-held nonlethal weapon 700 may be kept in a holster and automatically deactivated when not in use. The hand-held nonlethal weapon 100 and associated systems, such as the optical sensor 760, the acoustic sensor 750, the laser range finder 740, and so on, may be automatically activated. Such activation may take place upon withdrawing the hand-held nonlethal weapon 700 from the holster. The activation of the hand-held nonlethal weapon 700 and other features thereof may be actuated by a mechanical or magnetically actuated switch on the body 701 that is set to OFF when the weapon is fully inserted in the holster and set to ON when it is withdrawn from the holster.

In further embodiments, the hand-held nonlethal weapon 700*a* may further be operated in a "practice" mode wherein the reactive deterrence function is deactivated, and a user may utilize the hand-held nonlethal weapon 700*a* for practice purposes only. The hand-held nonlethal weapon 700*a* may comprise the laser rangefinder 740 mounted adjacent to the barrel. When depressing the trigger switch 701*b* when in the deactivated mode, the laser rangefinder 740 may be activated, allowing the user to practice aiming the hand-held nonlethal weapon 700*a*.

In further embodiments, the laser site may also be activated while in active mode to either assist a user in aiming the hand-held nonlethal weapon 700*a* while in use and to provide feedback data to the user and to the hand-held nonlethal weapon 700*a*, specifically to the control driver 710, which may be communicated to a mobile electronic device 700, and subsequently to a central server, or in other embodiments, such data may be transferred directly to the central server.

The following represent various embodiments of the hand-held nonlethal weapon:

A first embodiment may include a hand-held nonlethal weapon, comprising: a body; a battery coupled to the body; a power supply operably coupled to the battery; a power amplifier operably coupled to the power supply, the power amplifier operable to produce a nonlethal beam of energy; a beamformer operably coupled to the power amplifier, the beamformer being operable to shape and direct a nonlethal beam of energy; and a trigger coupled to the body and operably coupled to the power amplifier and the beamformer, wherein the trigger may be operable to be activated and wherein activating the trigger may be operable to initiate the formation of a nonlethal beam of energy, and wherein the nonlethal beam of energy may be operable to be projected from the body.

A second embodiment may comprise the hand-held nonlethal service weapon of embodiment 1, wherein the power amplifier may comprise an oscillator source oscillating at approximately 95 Gigahertz and able to produce the nonlethal beam of energy.

A third embodiment may comprise the hand-held nonlethal service weapon of embodiment 2, wherein the power amplifier may comprise a metamaterial.

A fourth embodiment may comprise the hand-held nonlethal service weapon of embodiment 3, wherein the metamaterial may comprise an array of: at least one InAlGaN HEMT transistor; at least one AlGaN spacer layer operably coupled to the at least one InAlGaN high electron mobility transistors; at least one electron channel layers operably coupled to the at least one AlGaN spacer layer; at least one buffer layer operably coupled to the at least one electron channel layer; and at least one a diamond substrate operably coupled to the at least one buffer layer, wherein the diamond substrate may be operable to disperse heat.

A fifth embodiment may comprise the hand-held nonlethal weapon of embodiment 4, wherein the power amplifier may comprise a solid-state resonator.

A sixth embodiment may comprise the hand-held nonlethal weapon of embodiment 5, wherein the beamformer may comprise a leaky wave antenna.

A seventh embodiment may comprise the hand-held nonlethal weapon of embodiment 6, further comprising a control driver, wherein the control driver comprises a processor and a memory, and wherein the control driver may be coupled to the body and wherein the control driver is operably coupled to at least one of the trigger, the power amplifier, the beamformer.

An eighth embodiment may comprise the hand-held nonlethal weapon of embodiment 7 wherein the beamformer may be shielded from external exposure.

A ninth embodiment may comprise the hand-held nonlethal weapon of embodiment 8, may further comprise a hermetic seal shielding the beamformer from exposure.

A tenth embodiment may comprise the hand-held nonlethal weapon of embodiment 9, may further comprise a data storage module, wherein the data storage module may be operably coupled to at least one of the trigger, the power amplifier, and beamformer.

An eleventh embodiment may comprise the hand-held nonlethal weapon of embodiment 10, may further comprise a laser range finder coupled to the body, wherein the laser range finder may be operably coupled to the control driver and may be operably coupled to the to the data storage module.

A twelfth embodiment may comprise the hand-held nonlethal weapon of embodiment 11, may further comprise an adjustment knob operable to adjust a pulse duration of the beam of energy.

A thirteenth embodiment may comprise the hand-held nonlethal weapon of embodiment 12, may further comprise an acoustic sensor and an optical sensor, wherein each of the acoustic sensor and the optical sensor may be operably coupled to the data storage.

A fourteenth embodiment may comprise the hand-held nonlethal weapon of embodiment 13 further comprising a laser range finder coupled to body and operably coupled to the control driver.

A fifteenth embodiment may comprise the hand-held nonlethal weapon of embodiment 14, wherein the laser range finder further comprises a laser site operable to produce a plurality of lasers, the plurality of laser forming an outline where the beam of energy will project on an actor, wherein the laser range finder comprises a metamaterials source to produce the laser and a beamformer operating in the green portion of the visual spectrum, and wherein the laser range finder is operably coupled to the trigger and to the control driver.

A sixteenth embodiment may comprise the hand-held nonlethal weapon of embodiment 14, further comprising an actuator coupled to the control driver and operable to activate the control driver and the operably connected components upon being actuated by withdrawal from a holster.

A seventeenth embodiment may comprise the hand-held nonlethal weapon of embodiment 14, wherein the control driver may be operable to connect to at least one of a mobile electronic device and central server.

A eighteenth embodiment may comprise the hand-held nonlethal weapon of embodiment 17, may further comprise a barrel coupled to the body, wherein the beam of energy may be projected from an opening in the barrel.

A nineteenth embodiment may comprise the hand-held nonlethal weapon of embodiment 17, wherein the body may be coupled to a mobile electronic device.

An twentieth embodiment may comprise a method of projecting a beam of energy from a hand-held nonlethal weapon, the method may comprise: engaging a trigger coupled to a body of the hand-held nonlethal weapon, the trigger activating a power amplifier coupled to the body, the power amplifier comprising a resonator, wherein the power amplifier and the resonator operate at 95 Gigahertz (GHz) and produce a beam of energy at 95 GHz; directing and shaping the beam of energy via a beamformer operably coupled to the power amplifier; and projecting the beam of energy toward an actor through at least one opening in the body.

A twenty-first embodiment may comprise the method of embodiment 20 may further comprise the trigger sending a signal to a control driver to initiate the formation of a beam of energy; and sending a signal from the control driver to the power amplifier and to the beamformer to form a beam of energy.

A twenty-second embodiment may comprise the method of embodiment 19 may further comprise the control driver receiving data from at least one user interface coupled to the body of the hand-held nonlethal weapon; and the control driver processing the data to provide detailed instruction to the power amplifier and the beamformer regarding the formation of the beam of energy.

A twenty-third embodiment may comprise a mobile electronic device comprising a hand-held nonlethal weapon, the hand-held nonlethal weapon comprising a processor, a memory, communication means and a body; a battery coupled to the body; a power supply operably coupled to the battery; a power amplifier operably coupled to the power supply, the power amplifier operable to produce a nonlethal beam of energy; a beamformer operably coupled to the power amplifier, the beamformer being operable to shape and direct a nonlethal beam of energy; and a trigger coupled to the body and operably coupled to the power amplifier and the beamformer, wherein the trigger may be operable to be activated and wherein activating the trigger may be operable to initiate the formation of a nonlethal beam of energy, and wherein the nonlethal beam of energy may be operable to be projected from the body.

A twenty-fourth embodiment may comprise a case comprising a body; a battery coupled to the body; a power supply operably coupled to the battery; a power amplifier operably coupled to the power supply, the power amplifier operable to produce a nonlethal beam of energy; a beamformer operably coupled to the power amplifier, the beamformer being operable to shape and direct a nonlethal beam of energy; and a trigger coupled to the body and operably coupled to the power amplifier and the beamformer, wherein the trigger may be operable to be activated and wherein activating the trigger may be operable to initiate the formation of a nonlethal beam of energy, and wherein the nonlethal beam of energy may be operable to be projected from the body, and the case further being operable to couple to a mobile electronic device.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A hand-held nonlethal weapon, comprising:

a body;

a battery coupled to the body;

a power supply operably coupled to the battery;

a power amplifier operably coupled to the power supply, the power amplifier operable to produce a nonlethal beam of energy;

a beamformer operably coupled to the power amplifier, the beamformer being operable to shape and direct a nonlethal beam of energy; and a trigger coupled to the body and operably coupled to the power amplifier and the beamformer, wherein the trigger is operable to be activated and wherein activating the trigger is operable to initiate the formation of a nonlethal beam of energy, and wherein the nonlethal beam of energy is operable to be projected from the body.

2. The hand-held nonlethal service weapon of claim 1, wherein the power amplifier comprises an oscillator source oscillating at approximately 95 Gigahertz and able to produce the nonlethal beam of energy.

3. The hand-held nonlethal service weapon of claim 2, wherein the power amplifier comprises a metamaterial.

4. The hand-held nonlethal service weapon of claim 2, wherein the metamaterial comprises an array of:

at least one InAlGaN HEMT transistor;

at least one AlGaN spacer layer operably coupled to the at least one InAlGaN high electron mobility transistors;

at least one electron channel layers operably coupled to the at least one AlGaN spacer layer;

at least one buffer layer operably coupled to the at least one electron channel layer; and at least one a diamond substrate operably coupled to the at least one buffer layer, wherein the diamond substrate is operable to disperse heat.

5. The hand-held nonlethal weapon of claim 4, wherein the power amplifier comprises a solid-state resonator.

6. The hand-held nonlethal weapon of claim 5, wherein the beamformer comprises a leaky wave antenna.

7. The hand-held nonlethal weapon of claim 6, further comprising a control driver, wherein the control driver comprises a processor and a memory, and wherein the control driver is coupled to the body and wherein the control driver is operably coupled to at least one of the trigger, the power amplifier, the beamformer.

8. The hand-held nonlethal weapon of claim 7 wherein the beamformer is shielded from external exposure.

9. The hand-held nonlethal weapon of claim 8, further comprising a hermetic seal shielding the beamformer from exposure.

10. The hand-held nonlethal weapon of claim 9, further comprising a data storage module, wherein the data storage module is operably coupled to at least one of the trigger, the power amplifier, and beamformer.

11. The hand-held nonlethal weapon of claim 10, further comprising a laser range finder coupled to the body, wherein the laser range finder is operably coupled to the control driver and is operably coupled to the to the data storage module.

12. The hand-held nonlethal weapon of claim 11, further comprising an adjustment knob operable to adjust a pulse duration of the beam of energy.

13. The hand-held nonlethal weapon of claim 12, further comprising an acoustic sensor and an optical sensor, wherein each of the acoustic sensor and the optical sensor are operably coupled to the data storage.

14. The hand-held nonlethal weapon of claim 13, wherein the beamformer comprises a laser range finder coupled to body and operably coupled to the control driver.

15. The hand-held nonlethal weapon of claim 14, wherein the control driver is operable to connect to at least one of a mobile electronic device and central server.

16. The hand-held nonlethal weapon of claim 15, further comprising a barrel coupled to the body, wherein the beam of energy is projected from an opening in the barrel.

17. The hand-held nonlethal weapon of claim 15, wherein the body is coupled to a mobile electronic device.

18. A method of projecting a beam of energy from a hand-held nonlethal weapon, the method comprising:

engaging a trigger coupled to a body of the hand-held nonlethal weapon, the trigger activating a power amplifier coupled to the body, the power amplifier comprising a resonator, wherein the power amplifier and the resonator operate at 95 Gigahertz (GHz) and produce a beam of energy at 95 GHz;

directing and shaping the beam of energy via a beamformer operably coupled to the power amplifier; and projecting the beam of energy toward an actor through at least one opening in the body.

19. The method of claim 18 further comprising the trigger sending a signal to a control driver to initiate the formation of a beam of energy; and sending a signal from the control driver to the power amplifier and to the beamformer to form a beam of energy.

20. The method of claim 19 further comprising the control driver receiving data from at least one user interface coupled to the body of the hand-held nonlethal weapon; and the control driver processing the data to provide detailed instruction to the power amplifier and the beamformer regarding the formation of the beam of energy.

* * * * *